US008792924B2

United States Patent
Xiao et al.

(10) Patent No.: US 8,792,924 B2
(45) Date of Patent: Jul. 29, 2014

(54) SYSTEM AND METHOD FOR MULTI-CELL ACCESS

(75) Inventors: Weimin Xiao, Hoffman Estates, IL (US); Deping Liu, Schaumburg, IL (US); Yunsong Yang, Schaumburg, IL (US)

(73) Assignee: Futurewei Technologies, Inc., Plano, TX (US)

( * ) Notice: Subject to any disclaimer, the term of this patent is extended or adjusted under 35 U.S.C. 154(b) by 520 days.

(21) Appl. No.: 13/102,853

(22) Filed: May 6, 2011

(65) Prior Publication Data

US 2012/0282964 A1    Nov. 8, 2012

(51) Int. Cl.
*H04W 72/08*    (2009.01)
*H04B 7/02*    (2006.01)
*H04W 52/14*    (2009.01)
*H04W 36/00*    (2009.01)

(52) U.S. Cl.
CPC ........... *H04B 7/024* (2013.01); *H04W 36/0061* (2013.01); *H04W 52/146* (2013.01)
USPC ........... 455/515; 370/328; 370/329; 370/330; 370/331; 370/332; 370/333; 370/334; 370/335; 370/336; 370/337; 370/338

(58) Field of Classification Search
USPC ................................................. 455/328–338
See application file for complete search history.

(56) References Cited

U.S. PATENT DOCUMENTS

| 7,047,009 B2* | 5/2006 | Laroia et al. ................... 455/437 |
| 2005/0124345 A1* | 6/2005 | Laroia et al. ................... 455/437 |
| 2006/0013160 A1* | 1/2006 | Haartsen ....................... 370/328 |
| 2009/0245212 A1 | 10/2009 | Sambhwani et al. |
| 2011/0034175 A1* | 2/2011 | Fong et al. ..................... 455/450 |
| 2012/0281636 A1* | 11/2012 | Xiao et al. ..................... 370/329 |
| 2013/0196675 A1* | 8/2013 | Xiao et al. ................. 455/452.1 |

FOREIGN PATENT DOCUMENTS

| CN | 101084692 A | 12/2007 |
| CN | 101448290 A | 6/2009 |
| WO | WO 2009120797 A1 | 10/2009 |

OTHER PUBLICATIONS

PCT Search Report and Written Opinion of Application No. PCT/CN2012/074789, date of mailing Aug. 16, 2012, 11 pages.
"3$^{rd}$ Generation Partnership Protect; Technical Specification Group Radio Access Network; Evolved Universal Terrestrial Radio Access (E-UTRA); Physical layer procedures (Release 10)," 3GPP TS 36.213 V10.0.1, Dec. 2010, 98 pages.

(Continued)

*Primary Examiner* — Bobbak Safaipour
(74) *Attorney, Agent, or Firm* — Slater & Matsil, L.L.P.

(57) ABSTRACT

A system and method for multi-cell access are provided. A method includes transmitting at least one control channel to a communications device. The at least one control channel includes control information, and the transmitting is performed by at least one cell in a subset of a cooperating set. The method also includes transmitting to the communications device based on control information transmitted to the communications device, or receiving from the communications device based on control information transmitted to the communications device. The transmitting is performed by at least one other cell in the cooperating set, or the receiving is performed by the at least one other cell in the cooperating set.

47 Claims, 16 Drawing Sheets

(56) References Cited

OTHER PUBLICATIONS

"3rd Generation Partnership Project; Technical Specification Group Radio Access Network; Evolved Universal Terrestrial Radio Access (E-UTRA) Further advancements for E-UTRA physical layer aspects (Release 9)," 3GPP TR 36.814 V9.0.0, Mar. 2010, 104 pages.

"3rd Generation Partnership Project; Technical Specification Group Radio Access Network; Evolved Universal Terrestrial Radio Access (E-UTRA); Physical Channels and Modulation (Release 10)" 3GPP TS 36.211 V10.1.0, Mar. 2011, 103 pages.

3rd Generation Partnership Project; Technical Specification Group Radio Access Network; Evolved Universal Terrestrial Radio Access (E-UTRA); Multiplexing and Channel Coding (Release 10), 3GPP TS 36.212 V10.1.0, Mar. 2011, 76 pages.

* cited by examiner

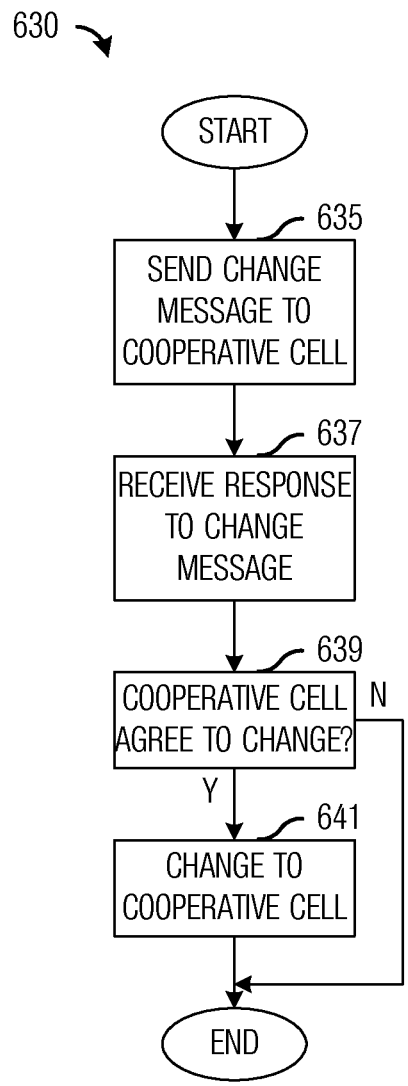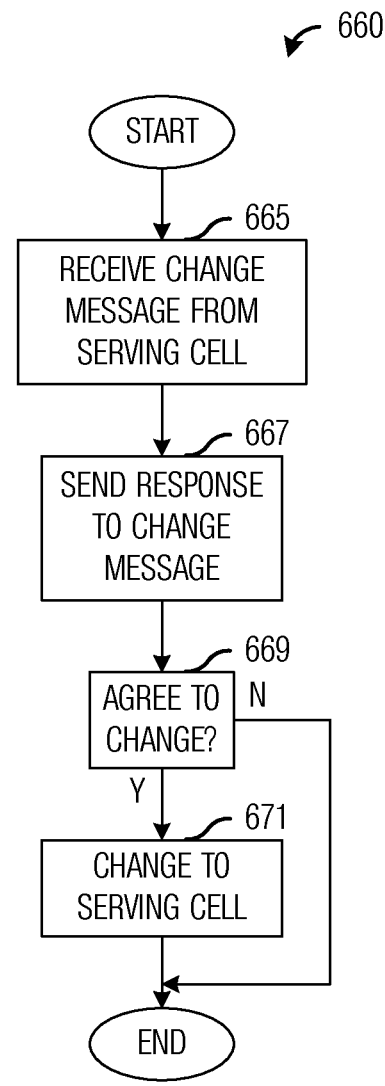
*Fig. 6b*  *Fig. 6c*

SYSTEM AND METHOD FOR MULTI-CELL ACCESS

TECHNICAL FIELD

The present invention relates generally to digital communications, and more particularly to a system and method for multi-cell access.

BACKGROUND

Generally, cooperative multi-point transmission (CoMP) may be considered in the Third Generation Partnership Project (3GPP) Long Term Evolution (LTE) Advanced as a tool to improve high data rate coverage, cell-edge throughput, and/or increase communications system throughput in both high and low communications system load scenarios.

In an uplink (UL) direction, where a User Equipment (UE), which is also commonly referred to as mobile station, subscriber, terminal, user, and so forth, transmits to an enhanced NodeB (eNB), which is also commonly referred to as NodeB, base station, communications controller, controller, and so on. UL coordinated multi-point reception implies reception of the UE's transmitted signals at multiple geographically separated points.

In a downlink (DL) direction, where the eNB transmits to the UE, DL coordinated multi-point transmission implies dynamic coordination among multiple geographically separated transmission points. An example of DL coordinated transmission schemes include coordinated beamforming where transmissions to a single UE is simultaneously transmitted from one of the transmission points and scheduling decisions are coordinated to control, e.g., interference generated in a set of coordinated cells.

Joint processing, which may include joint transmission (JT) and dynamic cell selection (DCS), is another example of a coordinated transmission scheme with more advanced interference mitigation capability. Joint transmission involves simultaneous transmissions to a single UE from multiple transmission points, e.g., to (coherently or non-coherently) improve the received signal quality and/or actively cancel interference from other UEs. DCS involves transmissions one source point at a time within CoMP cooperating set which is a set of one or more cells participating in CoMP operation with a UE.

DL coordinated multi-point transmission includes the possibility of coordination between different cells. From a radio-interface perspective, there may be no difference from the UE perspective if the cells belong to the same eNB or different eNBs. If inter-eNB coordination is supported, information needs to be signaled between eNBs, such as via an inter-eNB interface (e.g., an X2 interface).

Another form of coordinated transmission scheme is Multi-User (MU) Multiple Input, Multiple Output (MIMO), wherein transmissions to multiple UEs (or other destinations) sharing the same network resources (e.g., time domain and/or frequency domain network resources) may be differentiated in a spatial domain. A control channel is normally needed to schedule transmissions of each of the UEs participating in MU-MIMO. The UEs participating in MU-MIMO may be referred to herein as a UE pair or a UE group.

A heterogeneous network (HETNET) may be described as a communications system made up of high (transmission) power cells, such as macro cells, typically deployed as a planned network by a service provider, and low power node (LPN) cells, such as pico cells, femto cells, and so forth, that may be deployed by a service provider and/or a subscriber to help improve performance in high subscriber density areas or low coverage areas.

SUMMARY OF THE INVENTION

These and other problems are generally solved or circumvented, and technical advantages are generally achieved, by example embodiments of the present invention which provide a system and method for multi-cell access.

In accordance with an example embodiment of the present invention, a method is provided. The method includes transmitting at least one control channel to a communications device. The at least one control channel includes control information, and the transmitting is performed by at least one cell in a subset of a cooperating set. The method also includes transmitting to the communications device based on control information transmitted to the communications device, or receiving from the communications device based on control information transmitted to the communications device. The transmitting is performed by at least one other cell in the cooperating set, or the receiving is performed by the at least one other cell in the cooperating set.

In accordance with another example embodiment of the present invention, a cell is provided. The cell includes a control channel unit, a transmitter coupled to the control channel unit, and a receiver coupled to the control channel unit. The control channel unit generates at least one control channel that includes control information, the transmitter transmits the at least one control channel to a communications device, and transmits to the communications device based on the control information, and the receiver receives from the communications device based on the control information. The cell is part of at least one cell in a subset in a cooperating set, and the transmission of the at least one control channel is performed by at least one cell in the subset.

In accordance with another example embodiment of the present invention, a method is provided. The method includes searching for at least one control channel from at least one cell in a subset of a cooperating set, receiving the at least one control channel intended for a communications device, and receiving from at least one other cell based on control information in the at least one control channel, or transmitting to the at least one other cell based on control information in the at least one control channel. The at least one other cell is in the cooperating set.

In accordance with another example embodiment of the present invention, a communications device is provided. The communications device includes a control channel monitor, a receiver coupled to the control channel monitor, and a transmitter coupled to the control channel monitor. The control channel monitor searches for at least one control channel from at least one cell in a subset of a cooperating set, the receiver receives the at least one control channel intended for the communications device and receives from at least one other cell based on control information in the at least one control channel, and the transmitter transmits to the at least one other cell based on control information in the at least one control channel. The at least one other cell is in the cooperating set.

One advantage disclosed herein is that techniques for enhancing CoMP operation flexibility and performance, such as accessing multiple control channels, cross-cell scheduling, cell selective power control for the UL, serving cell switching, multi-cell reception of transmissions from multiple cells, and separate UL/DL serving cells are provided.

A further advantage of exemplary embodiments is that improved control channel load balancing is provided, which may help to distribute control channel load across different cells in a communications system. Distributing control channel load may help prevent situations wherein cells with available network resources are unable to allocate their use due to lack of control channel resources. Distributing control channel load also helps to improve control reliability.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 6b illustrates an example flow diagram of serving cell operations as a serving cell participates in a serving cell change according to example embodiments described herein;

FIG. 6c illustrates an example flow diagram of cooperating cell operations as a cooperating cell participates in a serving cell change according to example embodiments described herein;

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a 3GPP LTE compliant communications system. The invention may also be applied, however, to other communications systems, such as WiMAX, IEEE 802.16, and other communications systems that make use of CoMP operation to improve performance.

Figure 1:
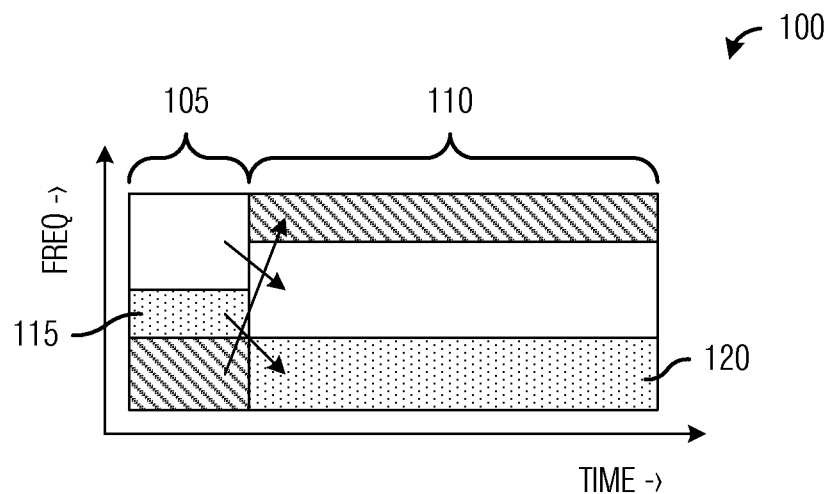
FIG. 1 illustrates an example frame structure for a DL transmission for a 3GPP LTE compliant communications system.

FIG. 1 illustrates a frame structure for a DL transmission 100 for a 3GPP LTE compliant communications system. Note that in the frequency domain, the representation shown in FIG. 1 is logical, and does not necessarily represent the actual physical location in frequency of the various blocks. DL transmission 100, which is transmitted over a transmission time interval (TTI) known as a subframe, may be divided into a control region 105 and a data region 110. Control region 105 may be used to signal control channels such as a Physical Downlink Control Channel (PDCCH), a Physical Hybrid Automatic Repeat Requested (HARQ) Indicator Channel (PHICH), a Physical Control Format Indicator Channel (PCFICH), and so forth, which data region 110 may be used to signal Physical Downlink Shared Channels (PDSCH), and so on. According to the 3GPP LTE technical standards, control region 105 is composed of one to three Orthogonal Frequency Division Multiplexed (OFDM) symbols and data region 110 appears in DL transmission 100 after control region 105.

PDCCHs in control region 105, such as PDCCH 115, may mainly be used as indications of corresponding PDSCH, such as PDSCH 120, or Physical Uplink Shared Channel (PUSCH). Such an indication includes information such as resource allocation, transmission format, Hybrid Automatic Repeat Request (HARQ) information, and so on. Therefore, a UE may need to first detect its PDCCH(s) and then acquire its corresponding PDSCH(s) and/or PUSCH(s). Multiple PDCCHs may be multiplexed within control region 105. In general, a UE may search, e.g., using blind detection techniques, for its PDCCH in a search space within control region 105 until it finds its PDCCH or it completes searching the search space without finding its PDCCH. If the UE completes searching the search space and does not find its PDCCH, then there is no PDCCH intended for the UE within DL transmission 100.

Logically, the PDSCH may be viewed as a data channel transmitted from a cell to a UE, while the PUSCH may be viewed as a data channel transmitted from a UE to a cell. For a PDSCH transmission logically from a cell, the transmission is marked by the identifier of the cell for scrambling, resource element mapping, and transmission formats for downlink channels including PDSCH, DM-RS, CRS, CSI-RS, and etc. Similarly, for a PUSCH transmission logically to a cell, the transmission is marked by the identifier of the cell for scrambling, resource element mapping, and transmission formats for uplink channels including PUSCH, uplink DM-RS, SRS, and etc. Other aspects of the PDSCH or PUSCH transmission may also associated to the configurations of the cell that the transmission is logically for.

Figure 2:
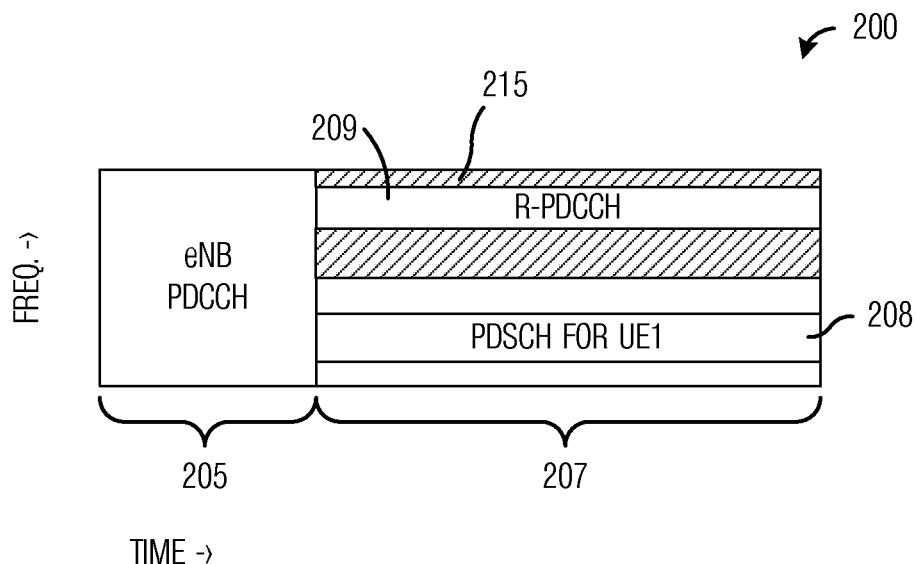
FIG. 2 illustrates an example frame structure for a DL link transmission from an eNB to a relay node (RN)

FIG. 2 illustrates a subframe structure for a DL transmission 200 from an eNB to a relay node (RN). DL transmission 200 includes a control region 205 and a data region 207. Note that in the frequency domain, the representation shown in FIG. 2 is logical, and does not necessarily represent the actual physical location in frequency of the various blocks. The various blocks may be continuous or discontinuous. Although control region 205 is labeled as an eNB PDCCH, control region 205 may contain other types of control channels or signals. Other types of control channels may include PCFICH, PHICH, and so forth, and other types of signals may include reference signals. Similarly, for simplicity data region 207 is shown with a PDSCH 208.

Since DL transmission 200 is also for a DL relay backhaul link, DL transmission 200 includes some resource elements dedicated for use as the DL relay backhaul link, such as Relay-Physical Downlink Control Channel (R-PDCCH) 209. In 3GPP LTE Release 10, an R-PDCCH may be used by a donor eNB to schedule transmissions on a backhaul link between the donor eNB and an RN. An R-PDSCH may also be known as a Un PDSCH. Although data region 207 is shown containing several types of channels, it may contain other channels and/or signals as well. The other types of signals may include reference signals.

In DL transmission 200, a RN does not know the exact location of its R-PDCCH. All it knows is that the R-PDCCH is located within a known set of resource blocks (RBs), commonly referred to as an R-PDCCH search space (an example of which is shown as search space 215 in FIG. 2). The R-PDCCH search space follows control region 205, occupying a set of subcarriers of one or several OFDM symbols in data region 207. Search space 215 may be specified by its frequency location.

R-PDCCH 209 (if present) for the RN is located in the RN's search space 215. Search space 215 may be referred to as a virtual system bandwidth, which, in general, may be considered to be a set of resource blocks that can be semi-statically configured for potential R-PDCCH transmission. In other words, time domain and/or frequency domain parameters of the set of resource blocks may be semi-statically configured. Like a PDCCH in control region 205, R-PDCCH 209 provides information to support the DL and UL transmissions. R-PDCCH 209 may include information such as: resource allocation, modulation and coding scheme (MCS), HARQ information, and so on. That is, R-PDCCH 209 contains the information for detecting and decoding a Physical Downlink Shared Channel (PDSCH), and/or the information for coding and transmitting a Physical Uplink Shared Channel (PUSCH).

The R-PDCCH may be multiplexed with the data channels, such as a PDSCH, and so forth, with time division multiplexing (TDM), frequency division multiplexing (FDM), or a combination thereof.

A relationship between R-PDCCH and R-PDSCH and/or R-PUSCH may be similar to the relationship between PDCCH and PDSCH and/or PUSCH with an exception being that a resource occupation style is different. R-PDCCH and R-PDSCH are multiplexed with FDM within a TTI. In the frequency domain, a set of RBs may be semi-statically configured for potential R-PDCCH transmission, from which a subset may be allocated for each R-PDCCH.

Generally, an eNB, an RN, a low power node (LPN), or so on, may be referred to as a communications controller. Typically, communications controllers may be sectorized into a number of sectors, with each sector being referred to as a cell, to increase utilization, decrease interference, and so forth. Without loss of generality, a cell, as used herein, may refer to a portion of a coverage area of a communications controller, or the coverage area of the communications controller in its entirety.

Figure 3A:
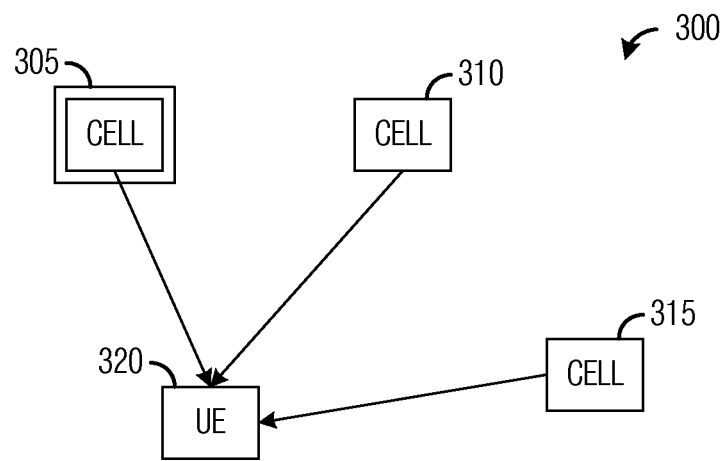
FIG. 3a illustrates an example portion of a communications system, wherein DL CoMP transmission between communications devices is highlighted according to example embodiments described herein.

FIG. 3a illustrates a portion of a communications system 300, wherein DL CoMP transmissions between communications devices is highlighted. While it is understood that communications systems may employ multiple cells capable of communicating with a number of UEs, only three cells and one UE are illustrated for simplicity. Communications system 300 includes a first cell 305, a second cell 310, a third cell 315, and a UE 320. First cell 305, second cell 310, third cell 315, and UE 320 are participating in DL CoMP transmission.

Typically, in DL CoMP operations a UE may receive transmissions from two or more cells, which may be macro cells, low power node (LPN) cells such as pico cells or femto cells, relay cells, remote radio head (RRH) cells, or combinations thereof. Therefore, the discussion of UE 320 receiving transmissions from three cells should not be construed as being limiting to either the scope or the spirit of the example embodiments.

Generally, in CoMP operation, there may be a cell that may function as a serving cell. A serving cell may also be referred to as a primary cell or an anchor cell. The serving cell may perform UE mobility control (such as handover control), encryption key generation, radio link failure reporting, and so forth. In addition, the UE may only monitor its radio link to the serving cell for radio link failure (RLF) measurement and report.

The serving cell may further assign an identifier (e.g., UE ID) to the UEs and manage the UE contexts. The serving cell may further provide RRC connections to the UE. The serving cell may further be the anchor point for an S1-MME connection with the UE's Mobility Management Entity (MME) for a UE, as well as provide transmission service of non-access-stratum (NAS) information between the UE and the UE's MME. Additionally, security keys for encryption and/or integrity protection of transmissions to and from the UE may be derived from parameters of the serving cell.

Other cells participating in the CoMP operation may be referred to as cooperating cells. The serving cell and the cooperating cells may be macro cells, low power node cells (such as pico cells and/or femto cells), relay cells, remote radio head cells, or combinations thereof. The serving cell and the cooperating cell(s) may be collectively referred to as a CoMP cooperating set of the UE.

As shown in FIG. 3a, first cell 305, second cell 310, and third cell 315 may transmit control and/or data to UE 320. UE 320 may utilize CoMP processing to process the transmissions from first cell 305, second cell 310, and third cell 315 to achieve improved data rate, increased reliability, lower error rate, and so forth.

Figure 3B:
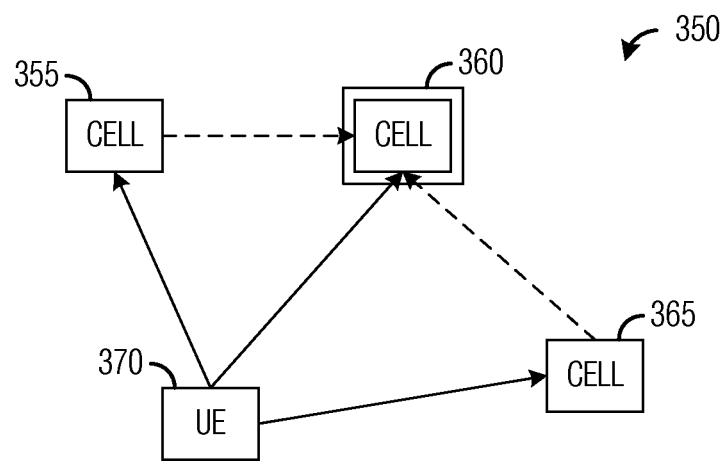
FIG. 3b illustrates an example portion of a communications system, wherein UL CoMP transmission between communications devices is highlighted according to example embodiments described herein.

FIG. 3b illustrates a portion of a communications system 350, wherein UL CoMP transmission between communications devices is highlighted. While it is understood that communications systems may employ multiple cells capable of communicating with a number of UEs, only three cells and one UE are illustrated for simplicity. Communications system 350 includes a first cell 355, a second cell 360, a third cell 365, and a UE 370. First cell 355, second cell 360, third cell 365, and UE 370 are participating in UL CoMP transmission. First cell 355, second cell 360, and third cell 365 may be from different communications controllers or from a single communications controller.

As shown in FIG. 3b, UE 370 may be transmitting control and/or data to first cell 355, second cell 360, and third cell 365. First cell 355 and third cell 365 may forward transmissions from UE 370 to second cell 360. First cell 355, second cell 360, and third cell 365 may jointly process transmissions from UE 370 to achieve improved data rate, increased reliability, lower error rate, and so forth. A serving cell, such as second cell 360, may coordinate transmissions from first cell 355 and third cell 365 to second cell 360.

In general, when a UE is participating in CoMP operation, for example, joint processing (either in dynamic cell selection or in joint transmission mode), the UE needs to obtain information about its assignment from control channels prior to receiving or transmitting.

One commonly used technique is to have the UE monitor only control channels from a serving cell of a CoMP cooperating set of the UE. The UE may receive its scheduling information from the serving cell on a PDCCH intended for the UE and marked, e.g., scrambled, interleaved, or so on, by the serving cell's cell identifier (e.g., cell ID). In another commonly used technique, the UE may receive its scheduling information on an R-PDCCH or some other form of PDCCH-like channel. A corresponding DL data transmission may be transmitted to the UE from physical antennas associated with the multiple cells. The data transmission (on a PDSCH or R-PDSCH) and an associated demodulation reference signal (DMRS) is sent to the UE by using the serving cell's cell identifier for transmission scrambling and/or sequence generation (although a part or a whole of the data transmission may actually be originating from another cell). The UE may continue to receive control information from the serving cell for an entirety of the CoMP operation or a handover takes place, which ever occurs first.

However, relying on only the serving cell for control information may place an undue burden on the serving cell, especially if the serving cell is participating in CoMP operations with a large number of UEs. As an example, if the serving cell is the only source of control information of a UE and the cell is heavily loaded, PDCCH resources may be exhausted while PDSCH resources remain unallocated. Therefore, a more flexible system and method for transmitting and receiving control information is needed.

According to an example embodiment, a cell (or cells) in a CoMP cooperating set transmitting the control information may be selected based on cell selection criteria to reduce a load on the serving cell of the CoMP cooperating set. Examples of cell selection criteria may include an amount of control information to be transmitted by a cell, a number of UEs served by the cell, an amount of control channel resources available at the cell, an amount of control information to be transmitted by other cells in the CoMP cooperating set, a number of UEs served by the other cells in the CoMP cooperating set, an amount of control channel resources available at the other cells in the CoMP cooperating set, communications system traffic and load around the cell, communications system traffic and load around the other cells in the CoMP cooperating set, and so forth.

A load on PDCCH resources of a cell may fluctuate as dynamic scheduling changes. For example, it may be configured so that retransmission packets are given scheduling priority over first transmission packets. Therefore, a number of PDCCHs and network resource occupied by the PDCCHs may fluctuate from subframe to subframe. The dynamic fluctuation may require dynamic adaptation of the size of the PDCCH region as indicated by a PCFICH, with the size being limited to a maximum size of PDCCH resources for a type of the current subframe, such as a normal subframe and/or a Multi-Media Broadcast over a Single Frequency Network (MBSFN) subframe. There may be situations where a packet cannot be scheduled due to lack of PDCCH resources even when there are sufficient network resources available for the actual transmission of the packet. The situation may be referred to as PDCCH blocking. A similar situation may occur with R-PDCCHs, wherein if more network resources are allocated to the R-PDCCHs, then less network resources are available for PDSCHs.

In some CoMP processing techniques, such as joint transmission from multiple sources (e.g., multiple cells) to a UE, the size of the control regions of the PDCCH needs to be aligned between the multiple sources in order to enable coherent combining of the signals from the multiple sources. Therefore, aligning the PDCCH control regions may place restrictions on schedulers and/or increases overhead to coordinate the aligning of the PDCCH control regions.

Therefore, it may be beneficial for UEs to be able to monitor scheduling information from multiple sources of its CoMP cooperating set for CoMP processing as well as inter-cell interference coordination (ICIC) processing.

With MU-MIMO operation, scheduling information may need to be provided to each of the UE pairs (or UE groups). In a single cell MU-MIMO scenario, the scheduling information may be provided by a single serving cell and DL data transmissions (including PDSCH and associated RS (e.g., DMRS)) will all be marked, e.g., scrambled, by a single serving cell identifier (and a Radio Network Temporary Identifier (RNTI) associated with each PDSCH transmission).

However, for CoMP operation, for example, joint processing, multiple UEs may also be paired (or grouped) together for PDSCH transmission using the same time and/or frequency resources. The pairing (or grouping) of multiple UEs may be referred to as multi-cell MU-MIMO. Generally, for multi-cell MU-MIMO or CoMP operation, a CoMP cooperating set for UEs to perform measurement and receive data transmissions may vary between UEs, i.e., the CoMP cooperating sets are UE-specific. A UE may be paired with another UE for multi-cell MU-MIMO transmissions as long as their transmissions (such as the PDSCH and associated RS, e.g., DM-RS) are marked (e.g., scrambled) by the same serving cell identifier. In other words, the transmissions appear to be from the same serving cell although they may be transmitted from antennas of multiple cell(s). Since the CoMP cooperating set is UE-specific, the UE may be paired with UEs whose CoMP cooperating sets and/or serving cells are different.

Figure 4:
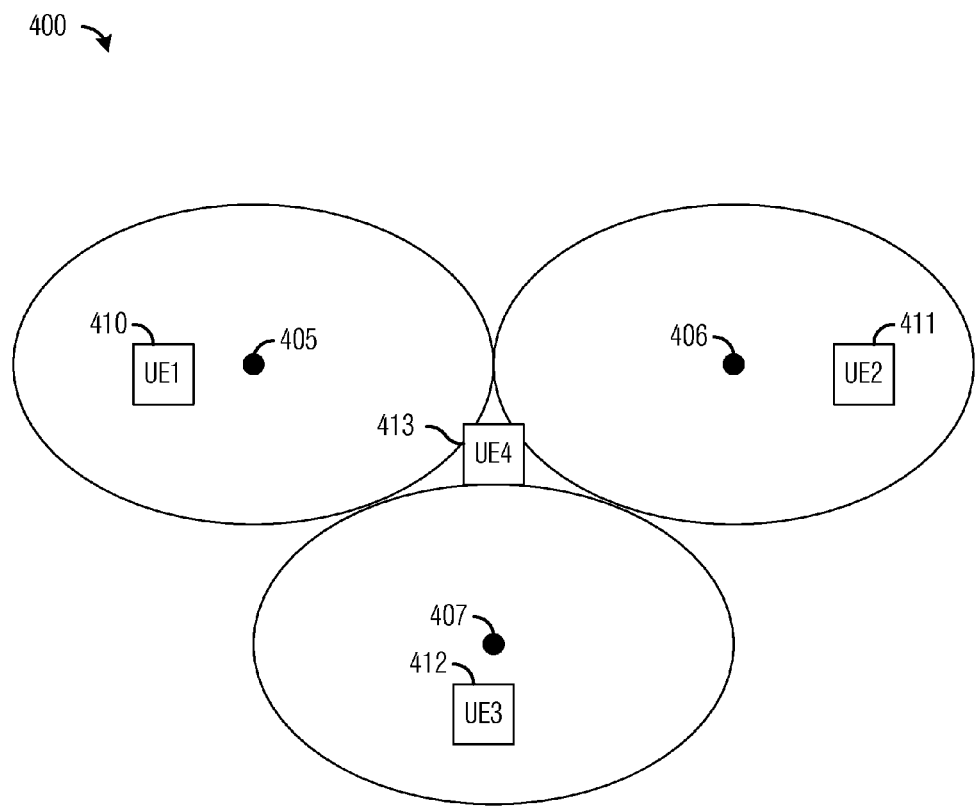
FIG. 4 illustrates an example portion of a communications system, wherein CoMP cooperating sets are highlighted according to example embodiments described herein.

FIG. 4 illustrates a portion of a communications system 400, wherein CoMP cooperating sets are highlighted. While it is understood that communications systems may employ multiple cells capable of communicating with a number of UEs, only three cells and four UEs are illustrated for simplicity. Communications system 400 includes a first cell 405, a second cell 406, and a third cell 407. Communications system 400 also includes a first UE 410, a second UE 411, a third UE 412, and a fourth UE 413, with first UE 410 being served by first cell 405, second UE 411 being served by second cell 406, and third UE 412 being served by third cell 407.

Fourth UE 413 may be located in an area of joint processing and may have a CoMP cooperating set consisting of {first cell 405, second cell 406, and third cell 407}. Fourth UE 413 may communicate with more than one cell. Theoretically, fourth UE 413 may be paired for MU-MIMO transmission with any one of first UE 410, second UE 411, or third UE 412, each of which is operating in one of the cells in the CoMP cooperating set of fourth UE 413. The other UEs (first UE 410, second UE 411, and third UE 412) may or may not be in the area of joint processing. In order to perform MU-MIMO pairings between fourth UE 413 and the other UEs, it may be critical for fourth UE 413 to be able to receive data transmissions from any of the cells in its CoMP cooperating set.

In a heterogeneous network deployment, a communications system may include macro cells (with high transmission power) and LPN cells, with low power node cells intended to provide coverage in coverage holes, such as pico cells, femto cells, and so on. In such a communications system, the macro cells and the LPN cells may be deployed in the same area and using the same carrier. Sometimes range extension is adopted to allow more UEs to associate with the LPNs. In range extension, a UE may be associated with a weaker cell, such as a pico cell, a RN cell, a femto cell, and so forth, with a relatively weak link compared to a stronger cell, for example, a macro cell. A relative weakness of the cells may be controlled by a communications system parameter, such as a range extension bias value.

Having the UE associate with the weaker cell that potentially has more network resources or lower traffic load (due to serving a smaller number of UEs), the overall performance of the UE and/or the communications system may improve since more resources are available for communications and resource blockage, such as PDCCH blockage, R-PDCCH blockage, and so forth, is less likely to occur. However, DL control channel from the weaker cell of UE (the UE's serving cell) may experience a low channel quality due to interference from the stronger cell. In such a situation, the UE may be configured to receive control and/or scheduling information from the stronger cell.

Furthermore, in heterogeneous network deployments, a DL power imbalance between transmissions from a stronger cell and a weaker cell may result in a UE being much closer (or have smaller pathloss) to a weaker cell (e.g., a LPN cell such as a pico cell or femto cell) than to its serving cell (e.g., a macro cell). The relatively large difference between the distances (or pathloss) between the UE and the weaker cell and the UE and the stronger cell may result in sub-optimal UL power control design and may therefore degrade overall UL performance.

One technique that may be used to mitigate the sub-optimal UL power control design is to make use of range extension. However, the range extension bias should not be too large to avoid DL control channel problems and hence cannot totally correct the sub-optimal UL power control design. Another technique is to have different cell associations for DL and UL of the UE. The use of different cell associations may complicate the architecture of the communications system since DL and UL are not independent. Another feasible technique may be to allow the UE to use both cells for both DL and UL.

Figure 5A:
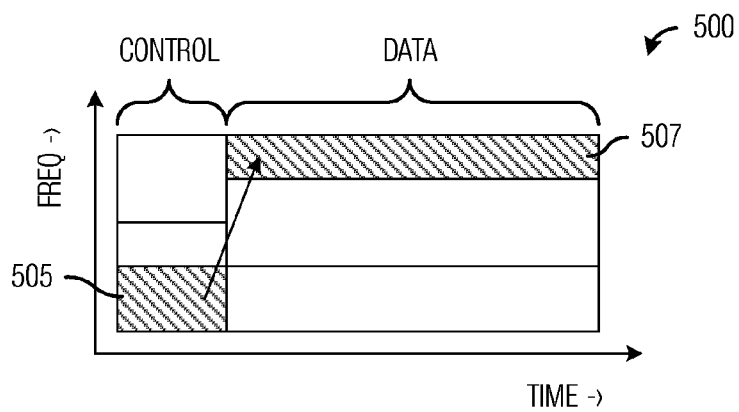
FIG. 5a illustrates an example DL transmission to a UE in CoMP operation from a first cell according to example embodiments described herein.

FIG. 5a illustrates a DL transmission 500 to a UE in CoMP operation from a first cell. It may be possible that a UE operating in a joint processing area receives different packets simultaneously from more than one cell. DL transmission 500 illustrates a first PDCCH 505 with an indication to a first PDSCH 507.

Figure 5B:
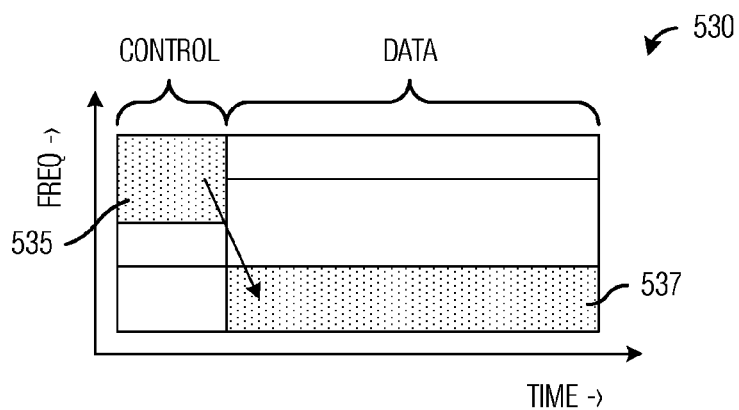
FIG. 5b illustrates an example DL transmission to a UE in CoMP operation from a second cell according to example embodiments described herein.

FIG. 5b illustrates a DL transmission 530 to a UE in CoMP operation from a second cell. DL transmission 530 illustrates a second PDCCH 535 with an indication to a second PDSCH 537.

Figure 5C:
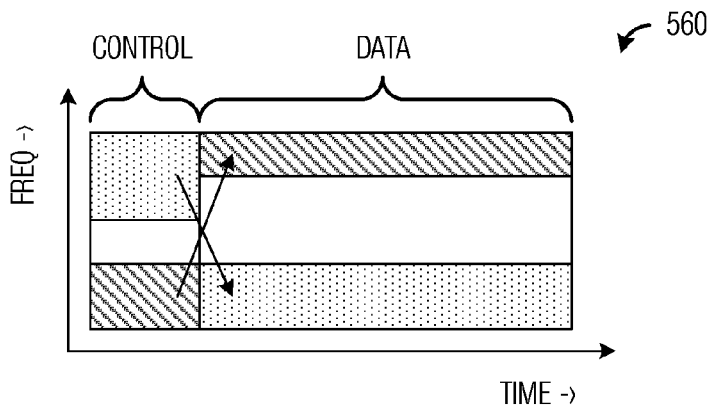
FIG. 5c illustrates an example combination DL transmission to a UE in CoMP operation from the first cell and the second cell according to example embodiments described herein.

FIG. 5c illustrates a combination DL transmission 560 to a UE in CoMP operation from the first cell and the second cell. Combination DL transmission 560 illustrates both the first PDCCH and the second PDCCH and the first PDSCH and the second PDSCH. Combination DL transmission 560 may be from the same or different subframes. Although the PDCCHs are from different cells, the PDCCH in combination DL transmission 560 may be from one or more cells. When the PDCCH is from multiple cells, a PDSCH and its corresponding PDCCH may not necessarily from the same cell.

If the UE is incapable of monitoring PDCCHs from multiple cells, then the multiple PDCCHs must be transmitted from a single cell, which may result in too many control channels in one cell and PDCCH blockage. A similar situation may arise with R-PDCCHs as well.

A wide range of possible CoMP operation configurations are possible in a heterogeneous network deployment. For example, a serving cell may either be a macro cell or a LPN cell, and a cooperative cell may either be a macro cell or a LPN cell. Furthermore, a UE may monitor a PDCCH (and/or R-PDCCH) and a PDSCH from a macro cell or a LPN cell, and a PUCCH and PUSCH from a macro cell or a LPN cell. Table 1 illustrates exemplary CoMP operation configurations, where M is macro cell, S is serving cell, and C is cooperative cell.

TABLE 1

Possible CoMP operation configurations.

| # | Serving Cell | Coop Cell | PDCCH/R-PDCCH | PDSCH | PUCCH | PUSCH | Use Case | Design |
|---|---|---|---|---|---|---|---|---|
| 1 | M | M | S | S | S | S | Common/cell-center | |
| 2 | M | LPN | S | S | S | S | Het-Net macro-cell center | |
| 3 | LPN | M | S | S | S | S | Het-Net LPN no RE | |
| 4 | M | M | S | C | | | Flexible Pairing | Cross-Cell Schedule |
| 5 | M | M | C | S | | | PDCCH Load Balance | Cross-Cell/Multi-Cell |
| 6 | M | M | C | C | | | Flex-Pair/PDCCH Load | Multi-Cell Monitor |
| 7 | M | LPN | S | C | | | Het-Net Off-load Traffic | Cross-Cell Schedule |
|   | M | LPN | C | S | | | | |
| 8 | M | LPN | C | C | | | Mobility Off-load Traffic/CCH | Multi-Cell Monitor |
|   | M | M | S | C | | | | |
| 9 | LPN | M | C | S | | | Het-Net RE/PDCCH Reliability | Cross-Cell/Multi-Cell |
|   | LPN | M | C | C | | | | |
| 10 | M | M | S | | S | C | UL Load Balance/PC-CoMP | Cross-Cell/Select-PC |
|   | M | M | S | | C | C | | |
|   | M | M | S | | C | S | | |
| 11 | M | LPN | S | | S | C | Unbalanced UL/DL | Cross-cell/Select-PC |
| 12 | M | LPN | S | | C | C | Unbalanced UL/DL | Cross-cell/DL-UL separation |
| 13 | M | LPN | S | | C | S | Unbalanced UL/DL | DL-UL separation |
|   | LPN | M | S | | S | C | | |
|   | LPN | M | S | | C | C | | |
|   | LPN | M | S | | C | S | | |
| 14 | M | M | E | E | | | Handover/Coop Set Update | Multi-cell monitor |
| 15 | M | LPN | B | B | | | Multiple DRB/QoS | Multi-cell reception |
|   | LPN | M | B | B | | | | |

Figure 6A:
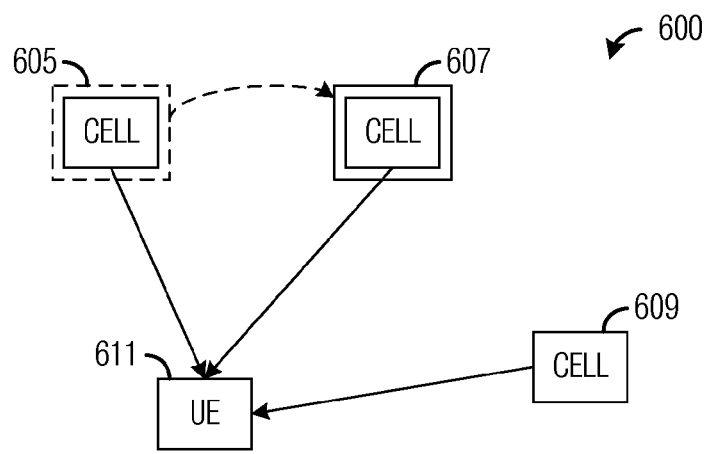
FIG. 6a illustrates an example CoMP cooperating set wherein a serving cell change occurs according to example embodiments described herein.

FIG. 6a illustrates a CoMP cooperating set 600 wherein a serving cell change occurs. As shown in FIG. 6a, CoMP cooperating set 600 includes a first cell 605, a second cell 607, a third cell 609, and a UE 611, with first cell 605, second cell 607, and third cell 609 transmitting to UE 611. Furthermore, first cell 605 is operating as the serving cell for CoMP cooperating set 600.

However, first cell 605 desires to no longer be the serving cell and wants to make second cell 607 be the serving cell. Changing (switching) from serving cell to cooperating cell may be due to a number of switching factors, including the serving cell being overloaded, the serving cell's resources being depleted, to balance load and resource utilization between cells in a CoMP cooperating set, to balance load and resource utilization in a communications system, improve communications system functions (such as handovers), and so on.

According to an example embodiment, at a UE(s) in a CoMP cooperating set wherein a serving cell change occurs, CoMP operation continues as if a serving cell change has not occurred. Additionally, cells in the CoMP cooperating set may not need to be un-configured, re-configured, deactivated, or so forth, due to the serving cell change.

During the serving cell change, some of the control functionalities of the serving cell may be transferred to the new serving cell (which was a cooperating cell before the serving cell change) while the serving cell becomes a cooperating cell. Other cooperating cells in the CoMP cooperating set may not be affected by the serving cell change. Examples of control functionalities of the serving cell may include RRC signaling to the UE, NAS signaling to the UE, security keys, UL control channel association, and so forth.

FIG. 6b illustrates a flow diagram of serving cell operations 630 as a serving cell participates in a serving cell change. Serving cell operations 630 may be indicative of operations occurring in a serving cell of a CoMP cooperating set as the serving cell (also referred to as a source serving cell) participates in a serving cell change with a cooperating cell (also referred to as a target serving cell) in the CoMP cooperating set. Serving cell operations 630 may occur while the serving cell is in a normal operating mode and the CoMP cooperating set includes a cooperating cell that is capable of assuming the role of a serving cell.

Serving cell operations 630 may begin with the serving cell sending a change message to a cooperating cell in the CoMP cooperating set (block 635). The change message may be a high level message, such as an X2 Application Protocol (X2AP) message. According to an example embodiment, the change message may be sent to the cooperating cells in the CoMP cooperating set. According to an example embodiment, the change message may be sent to a subset of the cooperating cells in the CoMP cooperating set. According to another example embodiment, the serving cell may have determined which cooperating cell in the CoMP cooperating set should be changed into a serving cell and may send the change message only to that cooperating cell, which may be referred to as a target serving cell hereinafter.

The serving cell may receive a response to the change message from a cooperating cell (block 637). The response to the change message may indicate if the cooperating cell is willing and/or able to perform the serving cell change. The response may be from one of the cooperating cells in the CoMP cooperating set, one of the cooperating cells in the subset of the cooperating cells in the CoMP cooperating set, or the cooperating cell determined by the serving cell as the cooperating cell to be changed into the serving cell (i.e., the target serving cell). According to an example embodiment, in situations wherein there are multiple target serving cells, coordination of some form may be used to select the target serving cell. For example, the multiple target serving cells may share information, such as signal strength, cell load, resource availability, number of UEs served, or so forth, and the target serving cell may be selected based on one or more of the shared information. The response to the change message may also be in the form of a high level message, such as an X2AP message, or it may be piggy backed onto a message being sent to the serving cell.

If the response to the change message indicates that the cooperating cell (e.g., one of the cooperating cells in the CoMP cooperating set, one of the cooperating cells in the subset of the cooperating cells in the CoMP cooperating set, or the cooperating cell determined by the serving cell as the cooperating cell that the serving cell wishes to change with) wishes to change to the serving cell (block 639), then the serving cell may change to a cooperating cell (block 641).

According to an example embodiment, the serving cell's change to a cooperating cell may include the serving cell sending a reconfiguration message, such as an RRC reconfiguration message, to the UE in the CoMP cooperating set to inform the UE that there is going to be a serving cell change. Once the serving cell sends the reconfiguration message to the UE, the serving cell may commence its change to a cooperating cell and cease to be the serving cell for the CoMP cooperating set.

FIG. 6c illustrates a flow diagram of cooperating cell operations 660 as a cooperating cell participates in a serving cell change. Cooperating cell operations 660 may be indicative of operations occurring in a cooperating cell of a CoMP cooperating set as the cooperating cell (also referred to as a target serving cell) participates in a serving cell change with a serving cell (also referred to as a source serving cell) in the CoMP cooperating set. Cooperating cell operations 660 may occur while the cooperating cell is in a normal operating mode and the serving cell wishes to change into a cooperating cell.

Cooperating cell operations 660 may begin with the cooperating cell receiving a change message from the serving cell (block 665). The change message may be a high level message, such as an X2AP message. According to an example embodiment, the serving cell may have transmitted the change message to all or a subset of cooperating cells in the CoMP cooperating set. According to an example embodiment, the serving cell may have specifically selected the cooperating cell as the recipient of the change message.

The cooperating cell may send a response to the change message to the serving cell (block 667). The response to the change message may indicate if the cooperating cell is willing and/or able to perform the serving cell change. The response to the change message may be in the form of a high level message, such as an X2AP message, or the response to the change message may be piggy backed onto a message being sent to the serving cell.

If the cooperating cell is willing and/or able to perform the serving cell change (block 669), the cooperating cell may change into a serving cell (block 671).

According to an example embodiment, the cooperating cell's change to a serving cell may include the cooperating cell receiving a random access (RA) preamble from the UE and the cooperating cell sending a RA response (RAR) message to the UE, allocating some UL resources to the UE so the UE can transmit to the cooperating cell. The UE may send a reconfiguration complete message, such as an RRCConnectionReconfigurationComplete message, to the cooperating cell to complete the serving cell change. Upon receipt of the reconfiguration complete message, the cooperating cell will become the serving cell of the CoMP cooperating set, and the UE will consider the cooperating cell as the serving cell of the CoMP cooperating set. In the case where serving cell change (request) message is sent to multiple cooperating cells and more than one cooperating cell has responded positively, these extra steps as described above may serve the purpose to establish a single target serving cell as the new serving cell. The other cooperating cells that have responded positively to the serving cell change (request) message but do not receive the random access preamble from the UE will not become the new serving cell and may continue to be a cooperating cell.

Figure 6D:
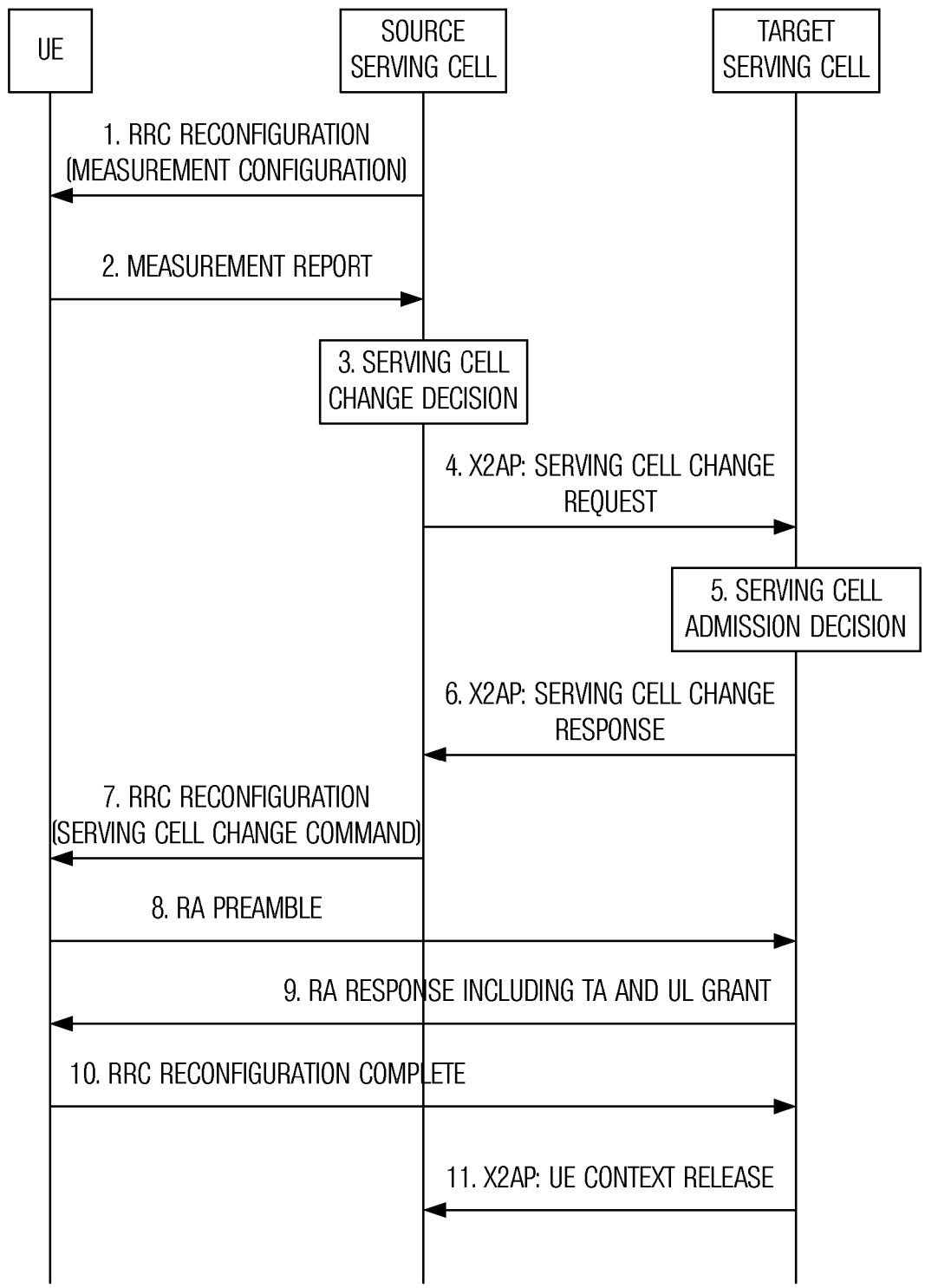
FIG. 6d illustrates an example diagram of messages exchanged and operations occurring in a serving cell change according to example embodiments described herein.

FIG. 6d illustrates a diagram of messages exchanged and operations occurring in a serving cell change. According to an example embodiment, the serving cell change involves a UE, a serving cell (a source serving cell), and a cooperating cell (a target serving cell). The complete serving cell change procedure may not only involve the X2AP signaling exchanges between the source serving cell and the target serving cell, but also involves the RRC signaling exchanges between the source serving cell and the UE, and between the UE and the target serving cell before the target serving cell becomes the serving cell. The following description of various steps presents an illustrative embodiment of a procedure for serving cell change:

Step 1. Source serving cell sends a reconfiguration message to the UE to configure the UE to perform certain measurement tasks and to report the measurement results according to the criteria set in the message. The measurement tasks may be aimed to discover the changes of radio conditions between the UE and the serving cell, and between the UE and the cooperating cells. The measurement tasks may also be aimed to discover the changes of radio conditions between the UE and a non-serving and non-cooperating cell.

Step 2. UE performs the measurement tasks accordingly and responds with a measurement report.

Step 3. Source serving cell makes a decision regarding proceeding with serving cell change or not. The decision outcome is positive in this illustrative case.

Step 4. Source serving cell sends the X2AP "Serving Cell Change Request" message to the target serving cell.

Step 5. The target serving cell makes a decision regarding accepting with the new role as the serving cell or not. The decision outcome is positive in this illustrative case.

Step 6. After determining that it can accept the new role of serving cell, the target serving cell sends the X2AP "Serving Cell Change Response" message back to the source serving cell, optionally with the information of the dedicated random access preamble that the UE can use to send the random access channel to the target serving cell. After that the target serving cell will keep monitoring if the UE sends a random access preamble to it or not. A dedicate random access preamble assigned by the target serving cell may help the target serving cell to recognize the UE faster, thereby shortening the time required for the change of serving cell.

Step 7. Source serving cell sends the RRCConnectionReconfiguration message to the UE, informing UE the change of the serving cell, including the information of the target serving cell and the dedicated random access preamble if provided by the target serving cell.

Step 8. The UE sends the random access preamble to the target serving cell. If a dedicated random access preamble has been assigned to the UE, which is assumed in the illustrative embodiment, the UE should use the dedicated random access preamble.

Step 9. The target serving cell sends the random access response message to the UE, providing UL transmission timing adjustment (TA) information and allocating some UL resource for the UE to transmit to the target serving cell.

Step 10. The UE sends the RRCConnectionReconfigurationComplete message to the target serving cell to complete the serving cell change procedure. At this point, the UE and the target serving cell may consider the target serving cell is the new serving cell now.

Step 11. The new serving cell, which was the target serving cell before, may send a UE Context Release message to the source serving cell via the X2 interface, instructing the source serving cell to remove its role as the serving cell of this UE. Upon receiving such a message, the source serving cell will cease to be the serving cell and will become a cooperating cell if it is still a member in the CoMP cooperating set.

Figure 7A:
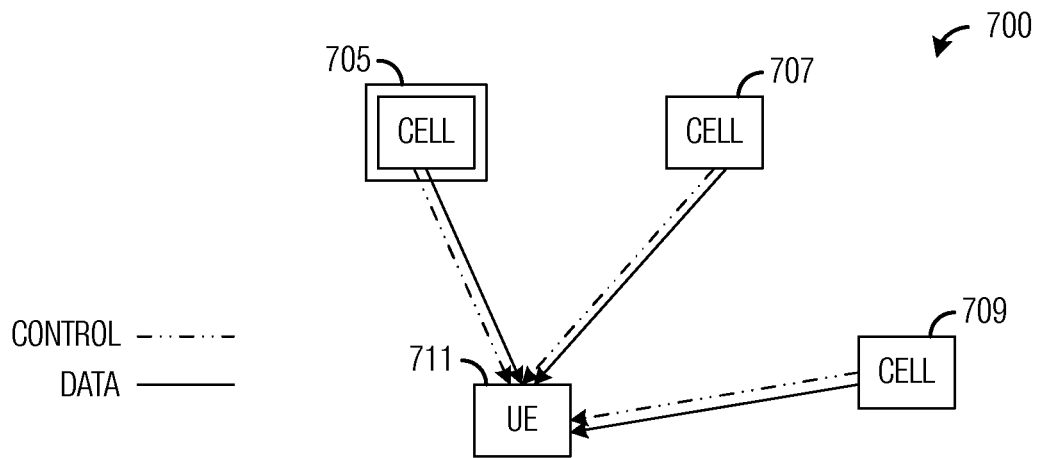
FIG. 7a illustrates an example CoMP cooperating set wherein a UE monitors control channels from multiple cells, i.e., multi-cell monitoring of control channels according to example embodiments described herein.

FIG. 7a illustrates a CoMP cooperating set 700 wherein a UE monitors control channels from multiple cells, i.e., multi-cell monitoring of control channels. As shown in FIG. 7a, CoMP cooperating set 700 includes a first cell 705, a second cell 707, a third cell 709, and a UE 711, with first cell 705, second cell 707, and third cell 709 transmitting to UE 711. Furthermore, first cell 705 is operating as the serving cell for CoMP cooperating set 700.

Additionally, first cell 705, second cell 707, and third cell 709 are transmitting control channel information. Although it is shown in FIG. 7a that all cells in CoMP cooperating set 700 are transmitting control channel information, in general, one or more cells in a CoMP cooperating set transmits control channel information. As an example embodiment, there may be a requirement that only one cell in a CoMP cooperating set transmits control channel information at the same time or subframe.

In multi-cell monitoring of control channels, a UE may listen to control channels from two or more cells within its CoMP cooperating set. In order to do so, the UE may need to synchronize to each of the two (or more) cells and obtain necessary information to decode the control channels. Examples of the necessary information may include a cell identifier (e.g., cell ID), system bandwidth (e.g., a number of physical resource blocks), number of cell-specific reference signal (CRS) antenna ports, frame type (e.g., frequency division duplexed (FDD), time division duplexed (TDD)), frame configuration if TDD, related control channel configuration, and so forth. The UE may obtain the necessary information related to the serving cell through synchronization detection, master information block (MIB), system information block (SIB), or so on. For cooperating cells, the UE may obtain the necessary information using the same techniques as in determining the necessary information for the serving cell, or through specific dedicated signaling (such as RRC signaling) from the serving cell.

A set of cells whose control channel the UE is to monitor may be configured by the serving cell of the CoMP cooperating set with the set of cells being a subset of cells in the CoMP cooperating set. Management of the set of cells to monitor may include adding and/or deleting a cell from the set of cells, activating and/or deactivating a cell from the set of cells. Management of the set of cells may be similar to managing the CoMP cooperating set. Special compensation may need to be provided for UE mobility. For example, a cell may be removed from the set of cells (or the CoMP cooperating set) if the UE moves out of range of the cell. However, when the UE moves out of range of its serving cell, a handover may occur. A serving cell change may be used to handle UE mobility as an alternative to a handover. Similarly, a cell may be added to the set of cells (or the CoMP cooperating set) if the UE moves into the range of the cell.

In order to simplify multi-cell monitoring of control channels, it may be beneficial to maintain a single UE identifier (e.g., UE ID) across the cells in the CoMP cooperating set.

Figure 7B:
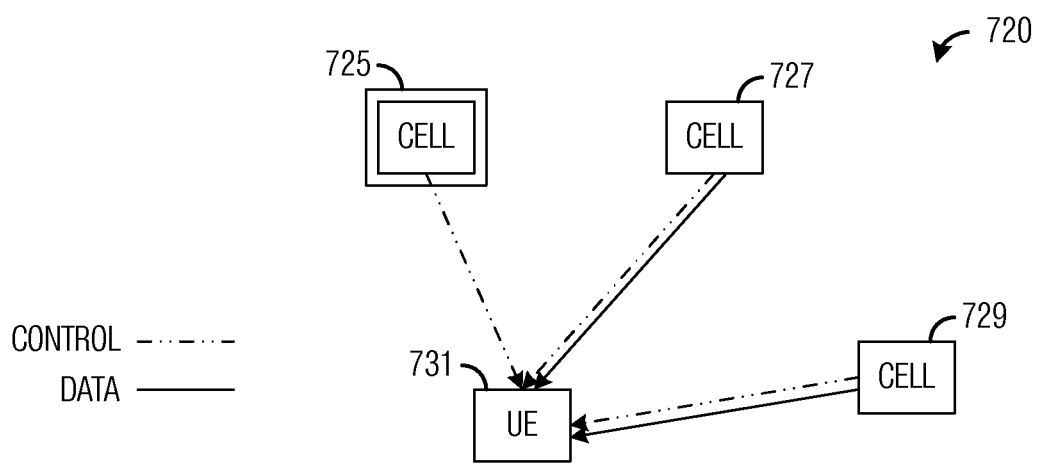
FIG. 7b illustrates an example CoMP cooperating set wherein a UE monitors control channels from multiple cells and receives information regarding a scheduled transmission from a first cell but the scheduled transmission is for a second cell, i.e., cross-cell scheduling according to example embodiments described herein.

FIG. 7b illustrates a CoMP cooperating set 720 wherein a UE monitors control channels from multiple cells and receives information regarding a scheduled transmission from a first cell but the scheduled transmission is for a second cell, i.e., cross-cell scheduling. As shown in FIG. 7b, CoMP cooperating set 720 includes a first cell 725, a second cell 727, a third cell 729, and a UE 731, with first cell 725, second cell 727, and third cell 729 transmitting to UE 731. Furthermore, first cell 725 is operating as the serving cell for CoMP cooperating set 720.

In general, cross-cell scheduling may be facilitated by scheduling a DL or UL transmission of a first cell through a control channel transmitted by a second cell. By cross-cell scheduling, a control channel of the first cell may be located in a cell together with control channels of the second cell.

An indicator may be needed for a UE to differentiate the control channels of different cells. The indicator may be a field in Downlink Control Information (DCI) format, for example. The indicator may include field size information, cell information (of the cross-cells), and so forth. The information in the indicator may be configured through high layer (for example, RRC layer) signaling based on criteria such as channel quality, control channel load, UE traffic type, and so on. The indicator may also be a field in RRC signaling.

As shown in FIG. 7b, first cell 725, second cell 727, and third cell 729 are transmitting control channel information. Although it is shown in FIG. 7b that all cells in CoMP cooperating set 720 are transmitting control channel information, in general, one or more cells in a CoMP cooperating set transmits control channel information. According to an example embodiment, there may be a requirement that only one cell in a CoMP cooperating set transmits control channel information.

Although first cell 725 may transmit data, an arrowed line representing data is not shown between first cell 725 and UE 731 since first cell 725 is transmitting control to UE 731. Instead of transmitting data to or receiving data from UE 731, first cell 725 may indicate transmissions of data to or from UE 731 for a different cell in CoMP cooperating set 720. For example, a control channel for UE 731 transmitted by first cell 725 may indicate a transmission for UE 731 by second cell 727 or third cell 729. Similarly, a control channel for UE 731 transmitted by first cell 725 may indicate a transmission opportunity for UE 731 to second cell 727 or third cell 729.

According to an example embodiment, first cell 725 may also transmit data to UE 731 or receive transmissions from UE 731 while it is performing cross-cell scheduling for other cells in the CoMP cooperating set. According to an example embodiment, while first cell 725 is performing cross-cell scheduling for other cells in the CoMP cooperating set, the other cells in the CoMP cooperating set may also be performing scheduling for themselves.

Figures 7C, 7D:
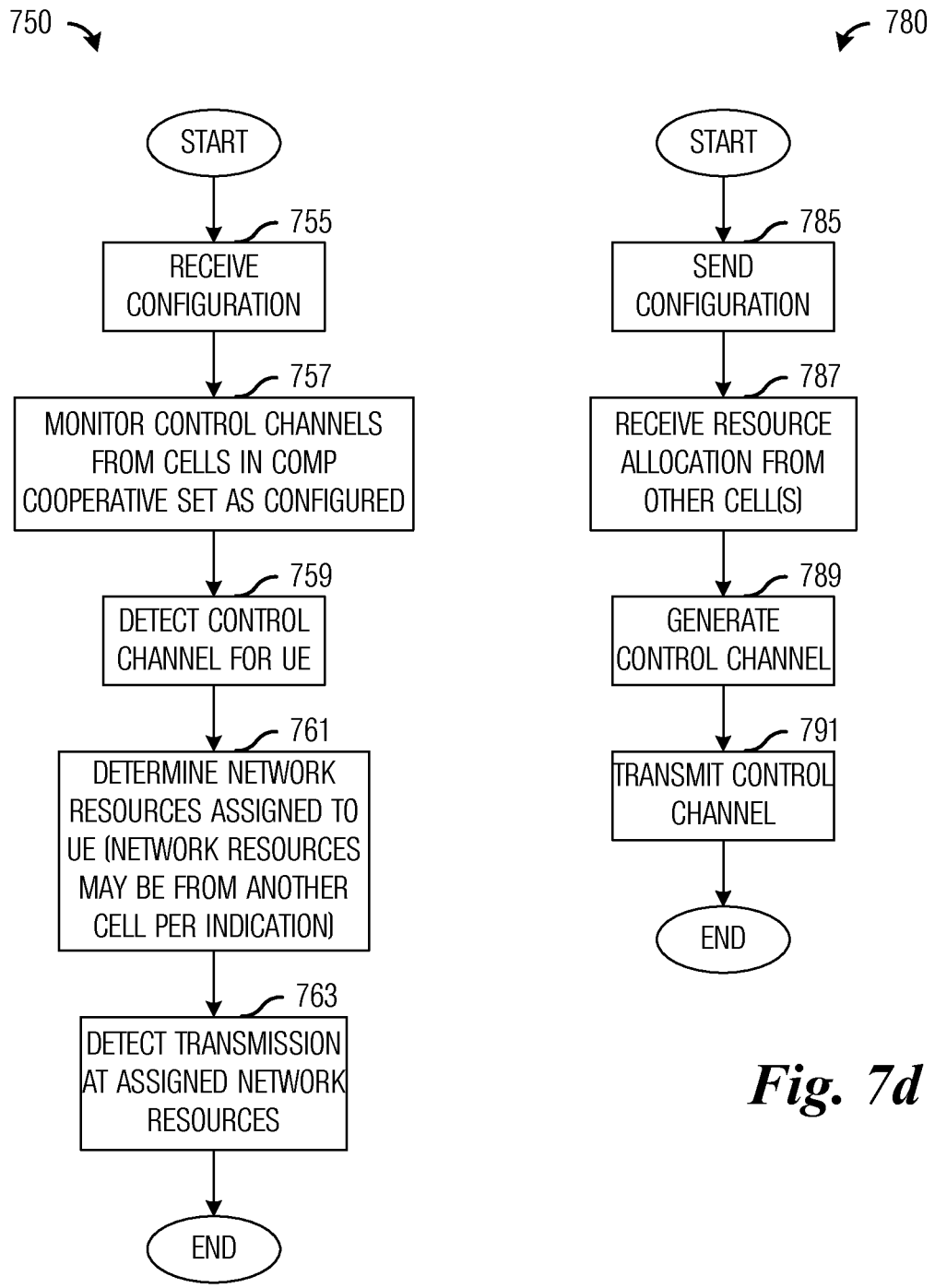
FIG. 7c illustrates an example flow diagram of UE operations in multi-cell monitoring of control channels, wherein cross-cell scheduling may be occurring on some of the control channels according to example embodiments described herein.
FIG. 7d illustrates an example flow diagram of cell operations for a cell participating in multi-cell monitoring of control channels, wherein cross-cell scheduling may be occurring on some of the control channels according to example embodiments described herein.

FIG. 7c illustrates a flow diagram of UE operations 750 in multi-cell monitoring of control channels, wherein cross-cell scheduling may be occurring on some of the control channels. UE operations 750 may be indicative of operations occurring in a UE as the UE monitors multiple control channels from cells in its CoMP cooperating set, and one or more cells in the CoMP cooperating set may be performing cross-cell scheduling. UE operations 750 may occur while the UE is in a normal operating mode.

UE operations 750 may begin with the UE receiving configuration information from the serving cell of the CoMP cooperating set (block 755). The configuration information provided by the serving cell may include a set of cells whose control channel the UE is to monitor, and necessary information that may include a cell identifier (e.g., cell ID), system bandwidth (e.g., a number of physical resource blocks), number of CRS antenna ports, frame type (e.g., frequency division duplexed (FDD), time division duplexed (TDD)), frame configuration if TDD, related control channel configuration (such as Ng parameter and phichDur), and so forth.

The UE may monitor the control channels of the cells in the set of cells (block 757) and detect a control channel intended for it (block 759). From the control channel intended for the UE, the UE may be able to determine network resources assigned to the UE (block 761). If the network resource assigned to the UE is cross-cell scheduled, then the control channel intended for the UE may contain an indicator indicating that it is a cross-cell scheduling.

The UE may then detect the transmission at the assigned network resources or transmit a transmission at the assigned network resources (block 763).

FIG. 7d illustrates a flow diagram of cell operations 780 for a cell participating in multi-cell monitoring of control channels, wherein cross-cell scheduling may be occurring on some of the control channels. Cell operations 780 may be indicative of operations occurring in a cell, such as a serving cell or a cooperating cell, of a CoMP cooperating set as the cell participates in multi-cell monitoring of control channels and one or more cells may be performing cross-cell scheduling. Cell operations 780 may occur while the cell is in a normal operating mode.

Cell operations 780 may begin with the cell sending configuration information to the UE (block 785). The configuration information provided by the cell may include a set of cells whose control channel the UE is to monitor, and necessary information that may include a cell identifier (e.g., cell ID), system bandwidth (e.g., a number of physical resource blocks), number of CRS antenna ports, frame type (e.g., frequency division duplexed (FDD), time division duplexed (TDD)), frame configuration if TDD, related control channel configuration (such as Ng parameter and phichDur), and so forth.

If the cell is performing cross-cell scheduling, the cell may receive information related to assigned network resources from other cells (block 787). The cell may then generate a control channel based on its own assigned network resources and assigned network resources from other cells (if the cell is performing cross-cell scheduling) (block 789) and transmit the control channel (block 791).

Figure 8A:
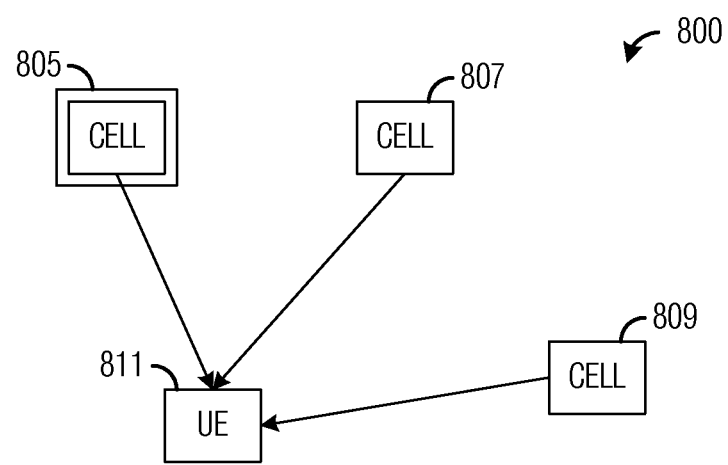
FIG. 8a illustrates an example CoMP cooperating set wherein a UE performs multi-cell reception according to example embodiments described herein.

FIG. 8a illustrates a CoMP cooperating set 800 wherein a UE performs multi-cell reception. As shown in FIG. 8a, CoMP cooperating set 800 includes a first cell 805, a second cell 807, a third cell 809, and a UE 811, with first cell 805, second cell 807, and third cell 809 transmitting to UE 811. Furthermore, first cell 805 is operating as the serving cell for CoMP cooperating set 800 and UE 811 is receiving data from multiple cells, such as first cell 805, second cell 807, and third cell 809.

Generally, multi-cell reception involves reception of DL data transmissions from multiple cells and may be an add-on to multi-cell monitoring of control channels. Multi-cell reception from multiple cells may be at different times and/or subframes.

As with cross-cell scheduling, an indicator may be used to indicate which assigned network resources belong to which cell.

According to an example embodiment, data transmissions occur in a cell with best performance, for example, highest channel quality, resource utilization, and so forth. A single control channel may be used (with cross-cell scheduling) to reduce the UE's effort in control channel monitoring. However, multiple control channels may also be used to help improve flexibility and/or control channel reliability. For example, control channels may be dynamically located in an R-PDCCH link region of a cell's transmission, such as in a transmission of a cell transmitting the UE's last data packet.

According to an example embodiment, multi-cell reception from different cells may be allowed at the same time and/or subframe, which may require the UE to be able to decode multiple data channels from multiple cells. The data channels, e.g., PDSCHs, may or may not occupy the same network resources within a subframe.

In a situation when the data channels from different cells occupy different network resources, the control channels corresponding to the data channels may be located in a control region of a single cell. While, if the control channels are located in more than one cell, the cells may be the same or different in terms of where their corresponding data channels are located. Therefore, it may be difficult to align the control regions of multiple cells to enable the UE to receive different information from the cells correctly and simultaneously. One technique to simplify the reception is to receive one control channel in a typical control region of one cell and receive other control channels in control regions (like R-PDCCH control regions) of other cells. Another technique may be to receive all control channels in R-PDCCH like control regions of the cells.

Figures 8B, 8C:
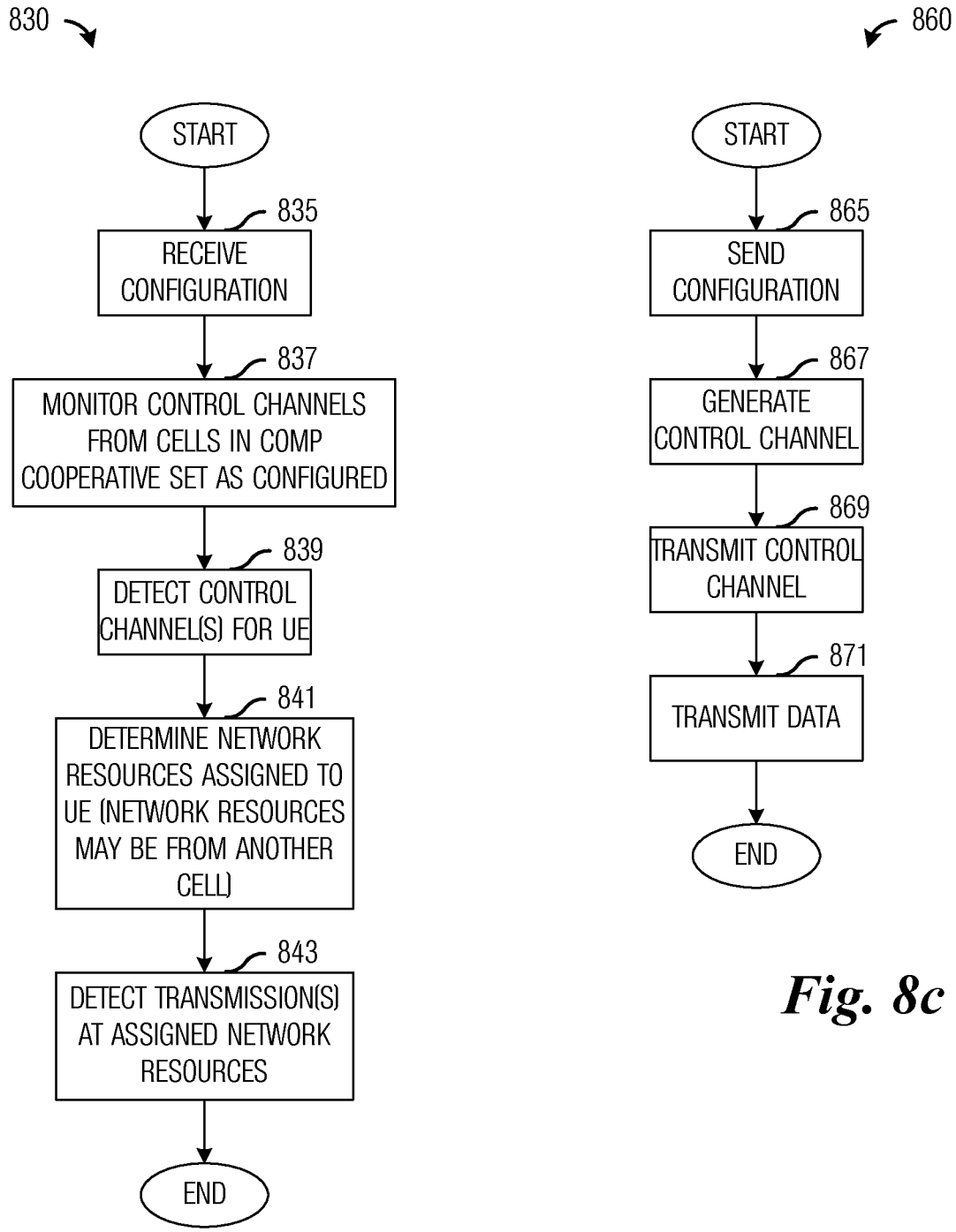
FIG. 8b illustrates an example flow diagram of UE operations in multi-cell reception according to example embodiments described herein.
FIG. 8c illustrates an example flow diagram of cell operations for a cell participating in multi-cell reception according to example embodiments described herein.

FIG. 8b illustrates a flow diagram of UE operations 830 in multi-cell reception. UE operations 830 may be indicative of operations occurring in a UE as the UE receives data from multiple cells in its CoMP cooperating set. UE operations 830 may occur while the UE is in a normal operating mode.

UE operations 830 may begin with the UE receiving configuration information from the serving cell of the CoMP cooperating set (block 835). The configuration information provided by the serving cell may include a set of cells whose control channel the UE is to monitor, and necessary information that may include a cell identifier (e.g., cell ID) of the cells in the CoMP cooperating set, system bandwidth (e.g., a number of physical resource blocks), number of CRS antenna ports, frame type (e.g., frequency division duplexed (FDD), time division duplexed (TDD)), frame configuration if TDD, related control channel configuration (such as Ng parameter and phichDur), and so forth.

The UE may monitor the control channels of the cells in the set of cells (block 837) and detect a control channel(s) intended for it (block 839). From the control channel(s) intended for the UE, the UE may be able to determine network resources assigned to the UE (block 841). If the network resource assigned to the UE is cross-cell scheduled, then the control channel intended for the UE may contain an indicator indicating that it is a cross-cell scheduling.

The UE may then detect the transmission(s) at the assigned network resources (block 843).

FIG. 8c illustrates a flow diagram of cell operations 860 for a cell participating in multi-cell reception. Cell operations 860 may be indicative of operations occurring in a cell, such as a serving cell or a cooperating cell, of a CoMP cooperating set as the cell participates in multi-cell reception. Cell operations 860 may occur while the cell is in a normal operating mode.

Cell operations 860 may begin with the cell sending configuration information to the UE (block 865). The configuration information provided by the cell may include a set of cells whose control channel the UE is to monitor, and necessary information that may include a cell identifier (e.g., cell ID), system bandwidth (e.g., a number of physical resource blocks), number of CRS antenna ports, frame type (e.g., frequency division duplexed (FDD), time division duplexed (TDD)), frame configuration if TDD, related control channel configuration (such as Ng parameter and phichDur), and so forth.

The cell may then generate a control channel based on its own assigned network resources and assigned network resources from other cells (if the cell is performing cross-cell scheduling) (block 867) and transmit the control channel (block 869). The cell may then transmit data corresponding to the assigned network resources (block 871).

Figure 9A:
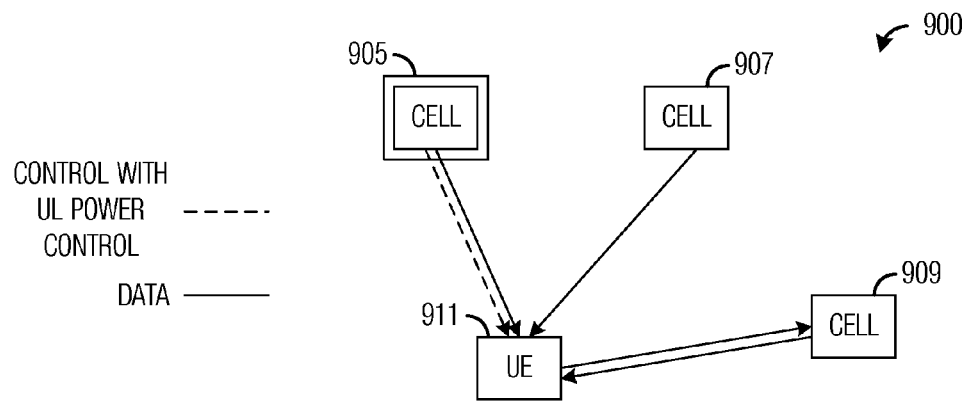
FIG. 9a illustrates an example CoMP cooperating set wherein cell selective UL power control is performed according to example embodiments described herein.

FIG. 9a illustrates a CoMP cooperating set 900 wherein cell selective UL power control is performed. As shown in FIG. 9a, CoMP cooperating set 900 includes a first cell 905, a second cell 907, a third cell 909, and a UE 911, with first cell 905, second cell 907, and third cell 909 transmitting to UE 911. Furthermore, first cell 905 is operating as the serving cell for CoMP cooperating set 900 and UE 911 is monitoring a downlink control channel which includes UL power control information. Additionally, UE 911 is transmitting to third cell 909, wherein the transmission is configured based on UL power control information for third cell 909.

In cell selective UL power control, UL transmission timing and/or power control may be specified for each cell, with each cell potentially having different power control configuration and parameters, as well as a different timing advance for the UE. The cell's UL transmission timing and/or power control configuration and parameters may be provided to the UE over a control channel corresponding to the cell or by a control channel transmitted by the serving cell.

Consider the PUSCH, according to the 3GPP LTE Rel-8 and Rel-9 technical standards, the setting of the UE transmit power level may be defined as:

$$P_{PUSCH}(i) = \min\{P_{CMAX}, 10\log_{10}(M_{PUSCH}(i)) + P_{PUSCH}(j) + \alpha(j) \cdot PL + \Delta_{TF}(i) + f(i)\},$$

where the exemplary uplink power control configuration and parameters may include:

$P_{CMAX}$ is the configured UE transmitted power;

$M_{PUSCH}(i)$ is the bandwidth of the PUSCH resource assignment expressed in number of resource blocks valid for subframe i;

$P_{O\_PUSCH}(j)$ is a parameter configured by the eNB;

$\alpha \in \{0, 0.4, 0.5, 0.6, 0.7, 0.8, 0.9, 1\}$ is a cell specific parameter provided by higher layers;

PL is the DL pathloss estimate calculated in the UE in dB and PL=referenceSignalPower−higher layer filtered reference signal received power (RSRP);

$\Delta_{TF}(i) = 10\log_{10}((2^{MPR \cdot K_s} - 1)\beta_{offset}^{PUSCH})$ for $K_S = 1.25$ is the power offset based on the transmission format and it can be turn off (equal to 0) for $K_S = 0$ and $\beta_{offset}^{PUSCH}$ is a configured parameter; and The current PUSCH power control adjustment state is given by f(i).

As another example, consider the PUCCH, according to the 3GPP LTE Rel-8 and Rel-9 technical standards, the setting of the UE transmit power level may be defined as:

$$P_{PUCCH} = \min\{P_{CMAX}, P_{0\_PUCCH} + PL + h(n_{CQI}, n_{HARQ}) + \Delta_{F\_PUCCH}(F) + g(i)\},$$

where the exemplary uplink power control configuration and parameters may include:

The parameter $\Delta_{F\_PUCCH}(F)$ is provided by higher layers. Each $\Delta_{F\_PUCCH}(F)$ value corresponds to a PUCCH transmission format (F);

$h(n_{CQI}, n_{HARQ})$ is a PUCCH format dependent value, where $n_{CQI}$ corresponds to the number of information bits for the channel quality information and $n_{HARQ}$ is the number of Hybrid Automatic Repeat Requested (HARQ) bits;

$P_{O\_PUCCH}$ is similar to $P_{O\_PUSCH}$ and is configured by the eNB; and g(i) is the current PUCCH power control adjustment state.

Furthermore, for UL SRS, the setting of the UE transmit power level may be defined as:

$$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\}.$$

The power control of SRS may be tied to the power control of the PUSCH of the UE with an offset value $P_{SRS\_OFFSET}$ and $M_{SRS}$ is the bandwidth of the SRS transmission.

The uplink power control configuration and parameters may be different for the various cells within the cooperating set. The UE may make use of the UL transmission timing and/or power control configuration and parameters corresponding to cells associated with assigned network resources. As an example, the UE may make use of the UL transmission timing and/or power control configuration and parameters corresponding to a configured cell within the cooperating set. The configured cell may be the serving cell or a cooperating cell. The serving cell may need to inform the UE the corresponding UL transmission timing and/or power control configuration and parameters for the configured cell.

As another example, the UE may make use of the UL transmission timing and/or power control configuration and parameters corresponding to the cell that the UE's UL transmission is logically targeted. The serving cell needs to inform the UE the corresponding UL transmission time and power control configuration and parameters for cells within the cooperating set that can be the candidate of the targeted cell for UL transmission. The serving cell may obtain the UL transmission timing and power control configuration and parameters of the cells participating in cell-selective power control within the cooperating set through an interface between the cells. Although the UE's UL transmission may be logically targeted to a specific cell within the CoMP cooperating set, all cells within the CoMP cooperating set may collaborate for the actual reception of the data from the UE.

Figure 9B:
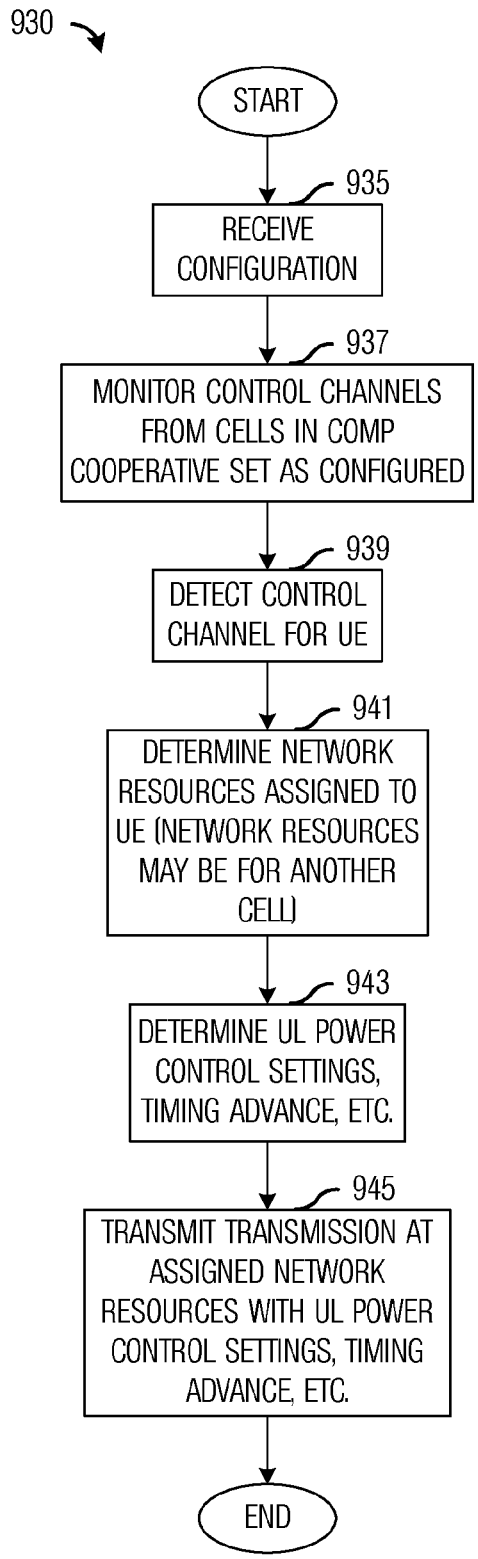
FIG. 9b illustrates an example flow diagram of UE operations in cell selective UL power control according to example embodiments described herein.

FIG. 9b illustrates a flow diagram of UE operations 930 in cell selective UL power control. UE operations 930 may be indicative of operations occurring in a UE as the UE performs cell selective UL power control for UL transmissions. UE operations 930 may occur while the UE is in a normal operating mode.

UE operations 930 may begin with the UE receiving configuration information from the serving cell of the CoMP cooperating set (block 935). The configuration information provided by the serving cell may include a set of cells whose control channel the UE is to monitor, and necessary information that may include a cell identifier (e.g., cell ID), system bandwidth (e.g., a number of physical resource blocks), number of CRS antenna ports, frame type (e.g., frequency division duplexed (FDD), time division duplexed (TDD)), frame configuration if TDD, related control channel configuration (such as Ng parameter and phichDur), and so forth.

The UE may being to monitor the control channels of the cells in the set of cells (block 937) and detect a control channel(s) intended for it (block 939). From the control channel(s) intended for the UE, the UE may be able to determine network resources assigned to the UE to allow the UE to transmit (block 941). If the network resource assigned to the UE is cross-cell scheduled, then the control channel intended for the UE may contain an indicator indicating that it is a cross-cell scheduling.

In addition to containing information about the assigned network resources, the control channel(s) may also contain information about UL transmission timing and/or power control configuration and parameters for the cell(s) associated with the assigned network resources. The UE may make use of the UL transmission timing and/or power control configuration and parameters to determine UL power control settings, timing advance, and so forth (block 943) and transmit its transmission(s) at the assigned network resources with the UL power control settings, timing advance, and so on (block 945).

Figure 9C:
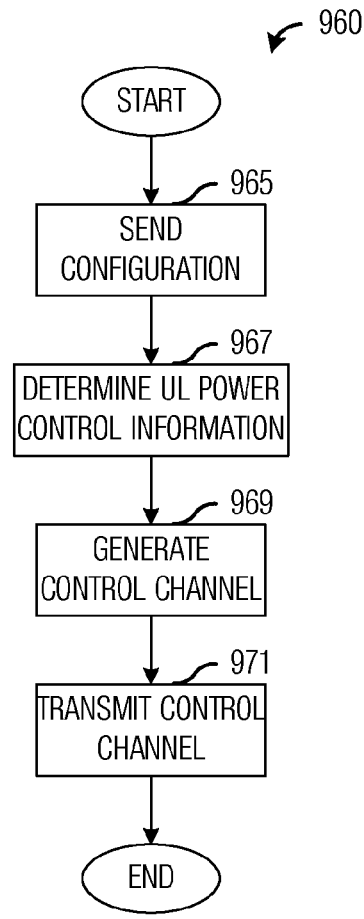
FIG. 9c illustrates an example flow diagram of cell operations for a cell participating in cell selective UL power control according to example embodiments described herein.

FIG. 9c illustrates a flow diagram of cell operations 960 for a cell participating in cell selective UL power control. Cell operations 960 may be indicative of operations occurring in a cell, such as a serving cell or a cooperating cell, of a CoMP cooperating set as the cell participates in cell-selective UL power control. Cell operations 960 may occur while the cell is in a normal operating mode.

Cell operations 960 may begin with the cell sending configuration information to the UE (block 965). The configuration information provided by the cell may include a set of cells whose control channel the UE is to monitor, and necessary information that may include a cell identifier (e.g., cell ID), system bandwidth (e.g., a number of physical resource blocks), number of CRS antenna ports, frame type (e.g., frequency division duplexed (FDD), time division duplexed (TDD)), frame configuration if TDD, related control channel configuration (such as Ng parameter and phichDur), and so forth.

The cell may determine UL power control information (block 967). If the cell is not performing cross-cell scheduling, the cell may determine UL power control information, such as UL transmission timing and/or power control information, only for its own cell. However, if the cell is performing cross-cell scheduling, the cell may need to obtain UL power control information for the cells for which it is performing cross-cell information. According to an example embodiment, the serving cell may have UL power control information for all cells within the CoMP cooperating set.

The cell may generate a control channel based on its own assigned network resources and assigned network resources from other cells (if the cell is performing cross-cell scheduling) and UL power control information for itself and other cells (if the cell is performing cross-cell scheduling) (block 969). The cell may then transmit the control channel (block 971).

Figure 10A:
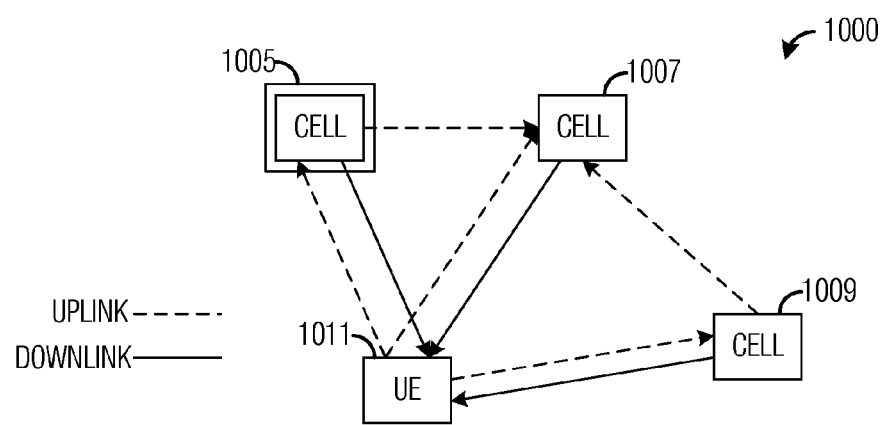
FIG. 10a illustrates an example CoMP cooperating set wherein DL/UL separation is performed according to example embodiments described herein.

FIG. 10a illustrates a CoMP cooperating set 1000 wherein DL/UL separation is performed. As shown in FIG. 10a, CoMP cooperating set 1000 includes a first cell 1005, a second cell 1007, a third cell 1009, and a UE 1011, with first cell 1005, second cell 1007, and third cell 1009 transmitting to UE 1011 and UE 1011 is transmitting to first cell 1005, second cell 1007, and third cell 1009. Furthermore, first cell 1005 is operating as the serving cell for the CoMP cooperating set 1000.

As shown in FIG. 10a, a UE may be able to transmit its UL control channel (including acknowledgements and/or negative acknowledgements, channel quality indication (CQI) feedback, system information (SI), random access channel (RACH), and so forth) to a cooperating cell instead of the serving cell (or a different cooperating cell), thereby implementing DL/UL separation.

When operating in joint processing mode, the UE may need to feedback additional CQI information. The CQI information may be sent to a cooperating cell if the serving cell of the CoMP cooperating set is experiencing a heavy UL control channel load. If the UE sends the CQI information to the cooperating cell, then the CQI may be fed back to the cooperating cell in a manner consistent with the configuration of the cooperating cell and occupy network resources scheduled by the cooperating cell.

If the UE's DL data channels are from different cells and occupy different network resources, corresponding CQI information may be feedback using UL resources of corresponding cells. For example, the CQI information may be collected and transmitted using the UL resources of one or more cells that may or may not be different from the cells transmitting the DL data channels, depending on UL control channel load. High layer signaling, such as RRC signaling, may be used to configure the transmissions.

Typically, UL acknowledgements and/or negative acknowledgements may be transmitted according to the DL control channels. In a situation wherein a UE's DL data channel from different cells occupy different network resources, the acknowledgements and/or negative acknowledgements may be fed back corresponding to PDCCH and/or R-PDCCH control channels. The acknowledgements and/or negative acknowledgements may be combined and transmitted using a single acknowledgements and/or negative acknowledgements channel to make efficient use of network resources. The acknowledgements and/or negative acknowledgements channel used to transmit the combined acknowledgements and/or negative acknowledgements may be explicitly configured by higher layer signaling (e.g., RRC signaling), informed through physical layer signaling to save resources, selected by the UE when transmitting to introduce greater flexibility or improve reliability, or combinations thereof. The different techniques for transmitting acknowledgements and/or negative acknowledgements can co-exist in a single communications system for different UEs, CoMP cooperating sets, or so on.

Figures 10B, 10C:
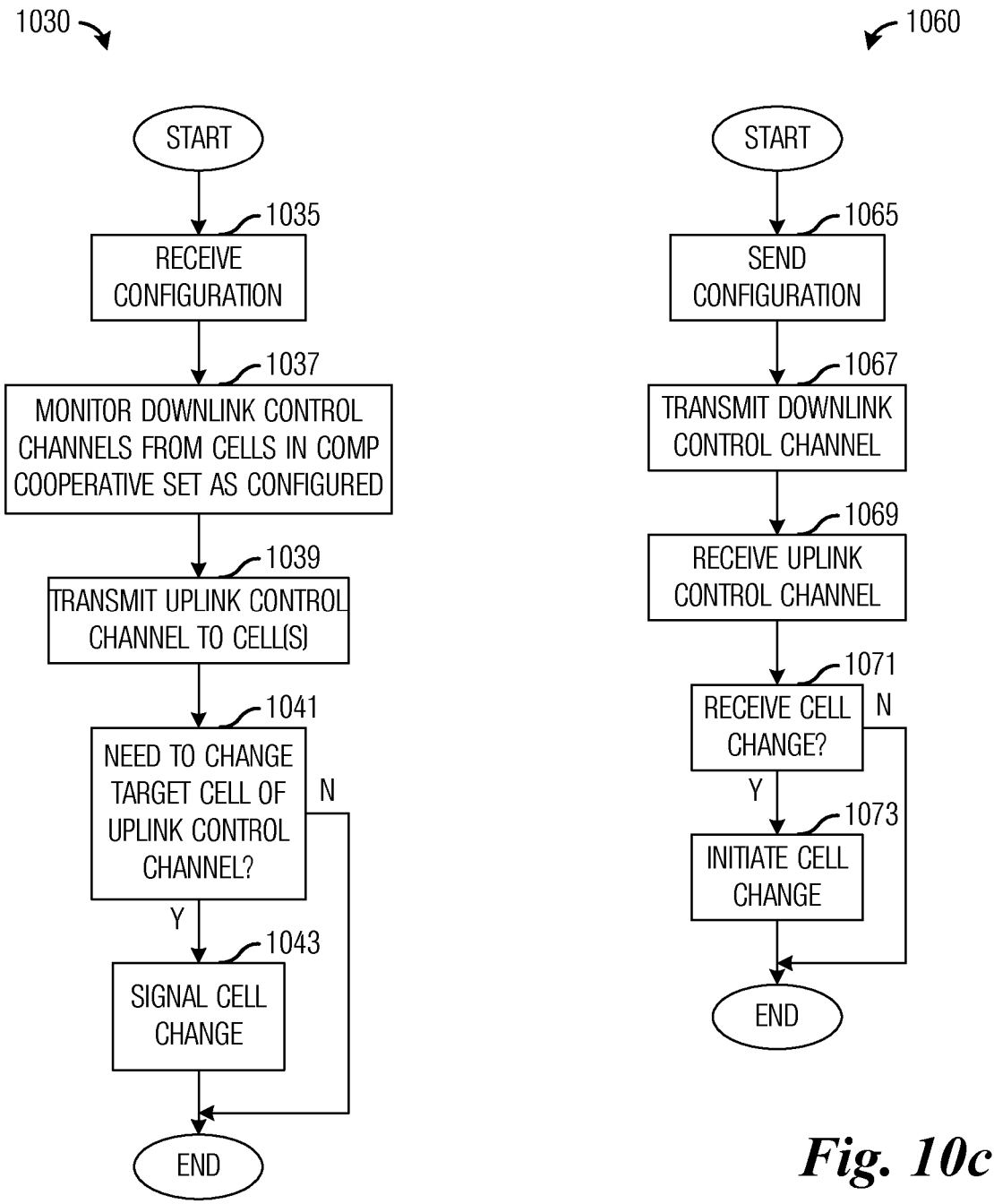
FIG. 10b illustrates an example flow diagram of UE operations in DL/UL separation according to example embodiments described herein.
FIG. 10c illustrates an example flow diagram of cell operations in DL/UL separation according to example embodiments described herein.

FIG. 10b illustrates a flow diagram of UE operations 1030 in DL/UL separation. UE operations 1030 may be indicative of operations occurring in a UE as the UE performs DL/UL separation for feeding back UL control information. UE operations 1030 may occur while the UE is in a normal operating mode.

UE operations 1030 may begin with the UE receiving configuration information from the serving cell of the CoMP cooperating set (block 1035). The configuration information provided by the serving cell may include a set of cells whose control channel the UE is to monitor, and necessary information that may include a cell identifier (e.g., cell ID), system bandwidth (e.g., a number of physical resource blocks), number of CRS antenna ports, frame type (e.g., frequency division duplexed (FDD), time division duplexed (TDD)), frame configuration if TDD, related control channel configuration (such as Ng parameter and phichDur), and so forth.

The UE may monitor DL control channels of cell(s) in the set of cells as configured (block 1037). Typically, the UE may provide UL control channel information to the cell(s) in the set of cells that it is monitoring DL control channels (block 1039).

However, depending on change conditions (such as load, control channel resource utilization, communications system traffic distribution, and so forth) at the cell(s) in the set of cells, the UE may need to change where it is sending the UL control channel information, i.e., the UE may need to change its target cell(s) (block 1041). If the UE needs to change the target cell(s), then the UE may signal a cell change (block 1043). The cell change, which may be initiated by higher layer signaling, such as RRC signaling, may result in a change in the target cell(s) of the UE. If there are more than one target cell, then one or more target cells may change. The target cell may change to another cell in the CoMP cooperating set that is selected based on factors such as load, resource utilization, communications system traffic distribution, and so on.

FIG. 10c illustrates a flow diagram of cell operations 1060 in DL/UL separation. Cell operations 1060 may be indicative of operations occurring in a cell as a UE performs DL/UL separation for feeding back UL control information. Cell operations 1060 may occur while the cell is in a normal operating mode.

Cell operations 1060 may begin with the cell sending configuration information to the UE (block 1065). The configuration information provided by the cell may include a set of cells whose control channel the UE is to monitor, and necessary information that may include a cell identifier (e.g., cell ID), system bandwidth (e.g., a number of physical resource blocks), number of CRS antenna ports, frame type (e.g., frequency division duplexed (FDD), time division duplexed (TDD)), frame configuration if TDD, related control channel configuration (such as Ng parameter and phichDur), and so forth.

The cell may transmit a DL control channel to the UE (block 1067). Generally, the UE may be expected to transmit UL control channel information back to the cell (block 1069). However, depending on conditions (such as load, resource utilization, communications system traffic distribution, and so forth) at the cell, the UE may need to change where it is sending the UL control channel information, i.e., the UE may need to change its target cell(s) and initiates a cell change. The UE may initiate a cell change by sending cell change message received at the cell (block 1071). The cell change message may be a higher layer message, such as a RRC message. Upon receipt of the cell change message, the cell may initiate a cell change (block 1073).

As an illustrative example, consider a situation wherein a CoMP cooperating set is performing joint transmission. A UE of the CoMP cooperating set may need to monitor the control channel (i.e., PDCCH) of its serving cell and one or more cooperating cells. Cross-cell scheduling from a first cell for data transmission and/or reception at a second cell may help to distribute control channel load, with corresponding PDSCH being transmitted from different cells according to the scheduling.

Benefits for the CoMP cooperating set may include balanced PDCCH load for the cells; for MU-MIMO and/or CoMP operation, the UE may be paired with any UE that has some overlap with the UE in CoMP cooperating sets; dynamic and/or fast cell selection is also supported; and reception from multiple cells within a single subframe can be supported.

As another illustrative example, consider a situation wherein a CoMP cooperating set is implemented in a heterogeneous network. For the DL, control channel reliability and traffic offloading may be provided. The control channel (i.e., PDCCH) may be transmitted from a macro cell for reliability (especially in the case of range extension), while data (PDSCH) transmission may be transmitted from a LPN to offload traffic. With a mobile UE, the serving cell may be a macro cell to maintain connection while PDCCH and/or PDSCH may be from a LPN for traffic and/or control channel offloading purposes.

For the UL, the PUCCH may be transmitted only to the serving cell, while PUSCH (and SRS) may be transmitted to the serving cell or cooperating cells according to scheduling. UL power control may be performed based on the configuration of the target cell. The UL serving cell may be different from the DL serving cell since: 1. DL and UL are usually unbalanced for macro cells and LPN, 2. UL traffic load balancing, 3. Selective UL power control and CoMP operation, and 4. Wasted resource for TDM may be used.

As another illustrative example, consider a situation wherein a CoMP cooperating set supports handover. A cooperating cell may be added and/or removed by high layer signaling (e.g., RRC signaling). Switching between serving cell and cooperating cell without deactivating or un-configuring any cell in the CoMP cooperating set. An UL serving cell (for PUCCH purposes) may be configured by higher layer signaling (e.g., RRC signaling) from the serving cell. Benefits may include joint CoMP cooperating set management and softer handover.

Figure 11:
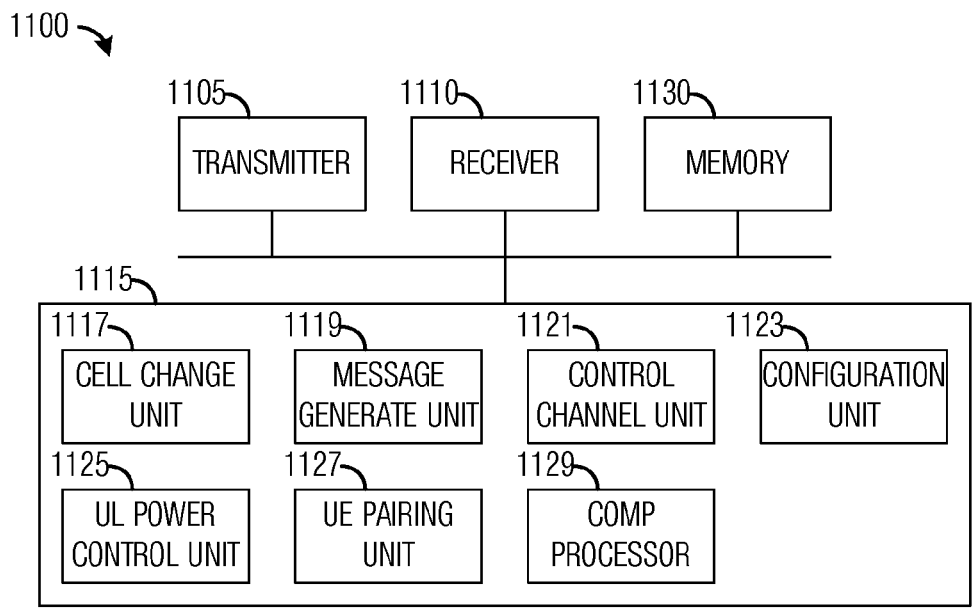
FIG. 11 provides an example communications device according to example embodiments described herein.

FIG. 11 provides an alternate illustration of a communications device 1100. Communications device 1100 may be an implementation of an eNB and/or a RN. Communications device 1100 may be used to implement various ones of the embodiments discussed herein. As shown in FIG. 11, a transmitter 1105 is configured to transmit information and a receiver 1110 is configured to receive information.

A cell change unit 1117 is configured to determine that a serving cell change is warranted, such as when the serving cell being overloaded, the serving cell's resources being depleted, to balance load and resource utilization between cells in a CoMP cooperating set, to balance load and resource utilization in a communications system, improve communications system functions (such as handovers), and so on. Serving cell switch unit 1117 is also configured to initiate the serving cell change by causing a serving cell switch message to be generated. Cell change unit 1117 is further configured to initiate a target cell change based on a target cell change message from a UE coupled to communications device 1100. A message generate unit 1119 is configured to generate messages, such as high layer messages (for example, a serving cell change message).

A control channel unit 1121 is configured to perform cross-cell scheduling, generate control channels based on information to be carried on the control channels (such as allocated network resources, UL power control information, and so on), and so forth. A configuration unit 1123 is configured to determine configuration information to be provided to a UE. The configuration information may include a set of cells whose control channel the UE is to monitor, and necessary information that may include a cell identifier (e.g., cell ID), system bandwidth (e.g., a number of physical resource blocks), number of CRS antenna ports, frame type (e.g., frequency division duplexed (FDD), time division duplexed (TDD)), frame configuration if TDD, related control channel configuration (such as Ng parameter and phichDur), and so forth.

A UL power control unit 1125 is configured to determine UL power control information, such as, UL transmission timing, power control, timing advance, and so on. A UE pairing unit 1127 is configured to select one or more UEs to be paired with a UE participating in CoMP operations. UE pairing unit 1127 may select the one or more UEs based on factors such as CoMP cooperating set, serving cell, and so forth. A CoMP processor 1129 is configured to provide CoMP processing on received data, such as joint processing, joint transmission, MU-MIMO, etc. A memory 1130 is configured to store CoMP cooperating sets, configuration information, UL power control information, UE pairings, received data, and so forth.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while cell change unit 1117, message generate unit 1119, control channel unit 1121, configuration unit 1123, UL power control unit 1125, UE pairing unit 1127, and CoMP processor 1129 may be software modules executing in a microprocessor (such as processor 1115) or a custom circuit or a custom compiled logic array of a field programmable logic array.

Figure 12:
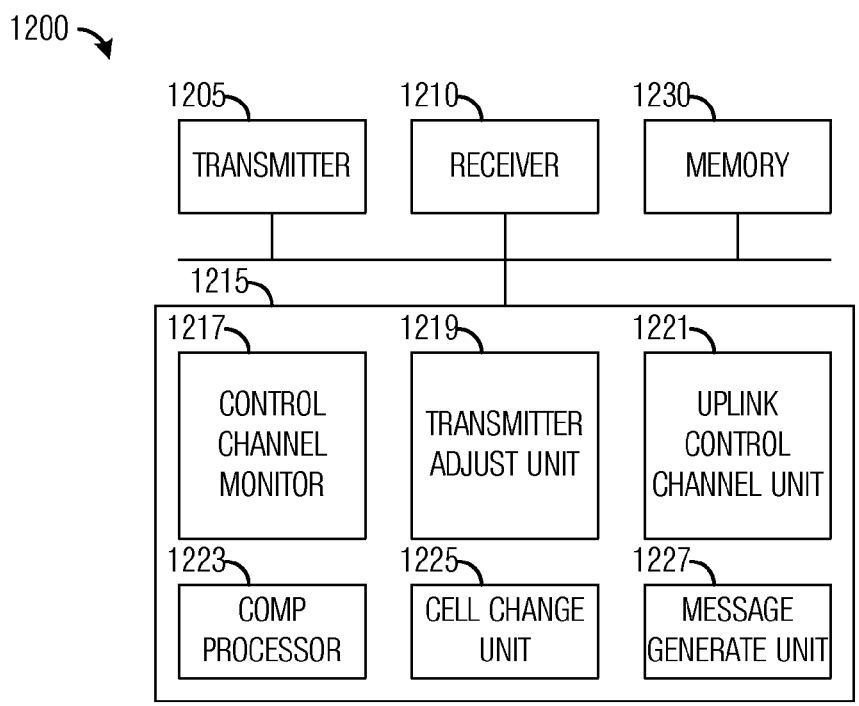
FIG. 12 provides an example communications device according to example embodiments described herein.

FIG. 12 provides an alternate illustration of a communications device 1200. Communications device 1200 may be an implementation of a UE. Communications device 1200 may be used to implement various ones of the embodiments discussed herein. As shown in FIG. 12, a transmitter 1205 is configured to transmit information and a receiver 1210 is configured to receive information.

A control channel monitor 1217 is configured to monitor control channel regions for control channels intended for communications device 1200. Control channel monitor 1217 may perform blind detection to find control channels. A transmitter adjust unit 1219 is configured to adjust parameters of a transmitter based on UL power control information provided by a cell. An uplink control channel unit 1221 is configured to generate control information for transmission on uplink control channels, determine if a change in a cell(s) wherein uplink control channel information is transmitted is needed, and so on.

A CoMP processor 1223 is configured to provide CoMP processing on received data, such as joint processing, joint transmission, MU-MIMO, etc. A cell change unit 1225 is configured to initiate a change in a cell(s) wherein uplink control channel information is transmitted by having a cell change message be generated and transmitted. Cell change unit 1225 is further configured to change serving cells. A message generate unit 1227 is configured to generate messages, such as high layer messages (for example, a cell change message). A memory 1230 is configured to store precoding matrix (matrices), precoding vector(s), precoding coefficient(s), channel information, channel estimates, eigenvalues, transmission parameters, algorithm types, etc.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, receiver 1210 and transmitter 1205 may be implemented as a specific hardware block, while control channel monitor 1217, transmitter adjust unit 1219, uplink control channel unit 1221, CoMP processor 1223, target cell change unit 1225, and message generate unit 1227 may be software modules executing in a microprocessor (such as processor 1215) or a custom circuit or a custom compiled logic array of a field programmable logic array.

Although FIGS. 7c, 7d, 8b, and 8c and associated discussion focus on receiving at a UE and transmitting at a cell, the example embodiments may also apply to transmitting at a UE and receiving at a cell and/or both transmitting and receiving at a UE and receiving and transmitting at a cell. Therefore, the discussion of receiving at a UE and transmitting at a cell should not be construed as being limiting to either the spirit or the scope of the example embodiments.

The above described embodiments of communications device 1100 and communications device 1200 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 6b, 6c, 6d, 7c, 7d, 8b, 8c, 9b, 9c, 10b, and 10c—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
transmitting at least one control channel to a communications device, wherein the at least one control channel comprises control information, and wherein the transmitting is performed by at least one cell in a subset of a cooperating set;
transmitting to and/or receiving from the communications device in accordance with the control information transmitted to the communications device, wherein the transmitting and/or receiving is performed by at least one other cell in the cooperating set;
transmitting an anchor cell change message to a cooperating cell in the cooperating set; and
initiating an anchor cell change when the cooperating cell agrees to change, wherein the anchor cell change is not initiated when the cooperating cell does not agree to change.

2. The method of claim 1, wherein a cell in the cooperating set is an anchor cell, and wherein the anchor cell provides services comprising radio resource control signaling, non-access-stratum signaling, security key parameters, mobility management, radio link failure monitoring, or a combination thereof.

3. The method of claim 1, further comprising receiving control information from the communications device, wherein the control information is received by at least one receiving cell of the cooperating set.

4. The method of claim 3, wherein the at least one receiving cell is not in the subset.

5. The method of claim 1, wherein the at least one cell is indicated to the communications device by physical layer signaling or radio resource control signaling.

6. The method of claim 1, wherein the anchor cell change message comprises a higher layer message.

7. The method of claim 6, wherein the anchor cell change message comprises an X2 application protocol message.

8. The method of claim 1, wherein the cooperating cell comprises a cooperating cell in the cooperating set selected for the anchor cell change.

9. The method of claim 1, wherein the cooperating cell comprises a plurality of cooperating cells in the cooperating set, wherein cooperating cell agrees to the change when at least one cooperating cell in the plurality of cooperating cells agrees to the change, and wherein the anchor cell change is initiated with the at least one cooperating cell.

10. The method of claim 1, wherein initiating a anchor cell change comprises sending a reconfiguration message to the communications device.

11. A cell comprising:
a control channel unit configured to generate at least one control channel comprising control information;
a transmitter coupled to the control channel unit, the transmitter configured to transmit the at least one control channel to a communications device, and to transmit to the communications device in accordance with the control information;
a receiver coupled to the control channel unit, the receiver configured to receive from the communications device in accordance with the control information,
wherein the cell is part of at least one cell in a subset in a cooperating set, and wherein a transmission of the at least one control channel is performed by at least one cell in the subset;
a cell change unit coupled to the transmitter and to the receiver, the cell change unit configured to initiate an anchor cell change with a cooperating cell in the cooperating set; and
a message generate unit coupled to the cell change unit, the message generate unit configured to generate a message to initiate an anchor cell change with the cooperating cell,
wherein the receiver is further configured to receive a response from the cooperating cell, and wherein the transmitter is further configured to transmit the message.

12. The cell of claim 11, the message comprises a higher layer message.

13. The cell of claim 12, wherein the message comprises an X2 application protocol message.

14. The cell of claim 11, the message generate unit is further configured to generate a reconfiguration message.

15. The cell of claim 14, wherein the transmitter is further configured to transmit the reconfiguration message to the communications device.

16. A method comprising:
searching, by a communications device, for a first plurality of control channels from a first plurality of cells in a cooperating set;
receiving, by the communications device, the first plurality of control channels intended for the communications device;
receiving from and/or transmitting to, by the communications device, the first plurality of cells in the cooperating set in accordance with first control information in the first plurality of control channels
searching, by the communication device, for a second plurality of control channels from a second plurality of cells in the cooperating set;
receiving, by the communication device, the second plurality of control channels intended for the communication device; and
receiving from and/or transmitting to, by the communication device, the second plurality of cells in the cooperating set in accordance with second control information in the second plurality of control channels.

17. The method of claim 16, wherein a cell in the first plurality of cells in the cooperating set is an anchor cell, and wherein the anchor cell provides services comprising radio resource control signaling, non-access-stratum signaling, security key parameters, mobility management, radio link failure monitoring, or a combination thereof.

18. The method of claim 17, wherein the anchor cell indicates to the communication device the second plurality of cells by physical layer signaling or radio resource control signaling.

19. The method of claim 16, wherein the first control information in the first plurality of the control channels further comprises uplink power control information and/or uplink transmission timing information for the first plurality of cells in the cooperating set, and wherein the method further comprises transmitting to a first cell in the first plurality of cells in the cooperating set, wherein the transmitting is conducted in accordance with uplink power control information and/or uplink transmission timing information associated with the first cell,
wherein the second control information in the second plurality of the control channels further comprises uplink power control information and/or uplink transmission timing information for the second plurality of cells in the cooperating set, and wherein the method further comprises transmitting to a second cell in the second plurality of cells in the cooperating set, where in the transmitting is conducted in accordance with uplink power control information and/or uplink transmission timing information associated with the second cell.

20. The method of claim 16, wherein at least one cell in the second plurality of cells is not in the first plurality of cells.

21. The method of claim 16, further comprising transmitting a first plurality of uplink control channels to a cell in the first plurality of cells of the cooperating set, and transmitting a second plurality of uplink control channels to a second cell in the second plurality of cells of the cooperating set.

22. The method of claim 21, wherein the pluralities of uplink control channels include information for acknowledgements and/or negative acknowledgements, and channel quality indication (CQI) feedback.

23. The method of claim 21, wherein uplink control information transmitted to the second cell in the second plurality of cells of the cooperating set is in accordance with a received transmission from the second plurality of cells in the cooperating set.

24. The method of claim 16, further comprising receiving a reconfiguration message, wherein the reconfiguration message comprises an indication of a new anchor cell.

25. The method of claim 24, wherein the reconfiguration message is a radio resource control message.

26. A communications device comprising:
a control channel monitor configured to search for a first plurality of control channels from a first plurality of cells in a cooperating set, and to search for a second plurality of control channels from a second plurality of cells in the cooperating set;
a receiver coupled to the control channel monitor, the receiver configured to
receive the first plurality of control channels from the first plurality of cells,
receive the second plurality of control channels from the second plurality of cells,
receive from a the first plurality of cells in the cooperating set in accordance with first control information in the first plurality of control channels,
receive from the second plurality of cells in the cooperating set in accordance with second control information in the second plurality of control channels; and
a transmitter coupled to the control channel monitor, the transmitter configured to
transmit to the first plurality of cells in accordance with the first control information in the first plurality of control channels, and
transmit to the second plurality of cells in accordance with the second control information in the second plurality of control channels.

27. The communications device of claim 26, wherein the first control information in the first plurality of control channels comprises uplink power control information and/or uplink transmission timing information for the first plurality of cells in the cooperating set, and wherein the transmitter is further configured to transmit to a first cell in the first plurality of cells in the cooperating set, wherein the transmitting is conducted in accordance with uplink power control information and/or uplink transmission timing information associated with the first cell; and
wherein the second control information in the second plurality of control channels comprises uplink power control information and/or uplink transmission timing information for the second plurality of cells in the cooperating set, and wherein the transmitter is further configured to transmit to a second cell in the second plurality of cells in the cooperating set, wherein the transmitting is conducted in accordance with uplink power control information and/or uplink transmission timing information associated with the second cell.

28. The communications device of claim 26, wherein at least one cell in the second plurality of cells is not in the first plurality of cells.

29. The communications device of claim 26, wherein the transmitter is further configured to transmit a first plurality of uplink control channels to a first cell in the first plurality of cells of the cooperating set, and to transmit a second plurality of uplink control channels to a second cell in the second plurality of cells of the cooperating set.

30. The communications device of claim 29, wherein the pluralities of uplink control channels include information for acknowledgements and/or negative acknowledgements, and channel quality indication (CQI) feedback.

31. The communications device of claim 26, wherein the receiver is further configured to receive a reconfiguration message, wherein the reconfiguration message comprises an indication of a new anchor cell.

32. The communications device of claim 31, further comprising a cell change unit coupled to the receiver, the cell change unit configured to change anchor cells of the communications device in accordance with the reconfiguration message.

33. The communications device of claim 26, wherein a cell in the first plurality of cells of the cooperating set is an anchor cell, and wherein the anchor cell provides services comprising radio resource control signaling, non-access-stratum signaling, security key parameters, mobility management, radio link failure monitoring, or a combination thereof.

34. The communications device of claim 33, wherein the cells in the second plurality of cells of the cooperating set do not provide services comprising radio resource control signaling, non-access-stratum signaling, security key parameters, mobility management, or radio link failure monitoring.

35. The communications device of claim 33, wherein the first plurality of cells is configured by the anchor cell to provide the first plurality of control channels.

36. The communications device of claim 26, wherein the first plurality of cells is different from the second plurality of cells.

37. The communications device of claim 26, wherein the communications device is configured to maintain a single user equipment identifier for the communications device across the first plurality of cells and the second plurality of cells.

38. The communications device of claim 26, wherein the receiver is further configured to receive from the first plurality of cells and the second plurality of cells at a same time or subframe.

39. The communications device of claim 26, wherein the receiver is further configured to receive from the first plurality of cells and second plurality of cells at different times and/or subframes.

40. The communications device of claim 26, wherein the receiver is further configured to receive from the first plurality of cells and the transmitter is configured to transmit to the second plurality of cells at different times and/or subframes.

41. The communications device of claim 26, wherein the receiver is further configured to receive downlink data from each cell in the first plurality of cells and in the second plurality of cells at a same time and/or subframe.

42. The method of claim 17, wherein the first plurality of cells is configured by the anchor cell to provide the first plurality of control channels.

43. The method of claim 16, wherein the first plurality of cells is different from the second plurality of cells.

44. The method of claim 16, further comprising maintaining, by the communications device, a single user equipment identifier for the communications device across the first plurality of cells and the second plurality of cells.

45. The method of claim 16, further comprising searching for and receiving the first plurality of control channels and the second plurality of control channels at a same time or subframe.

46. The method of claim 16, further comprising receiving from and/or transmitting to the first plurality of cells and the second plurality of cells at a different times and/or subframes.

47. The method of claim 16, further comprising receiving from and/or transmitting to the first plurality of cells and the second plurality of cells at a same time and/or subframe.

* * * * *

UNITED STATES PATENT AND TRADEMARK OFFICE
CERTIFICATE OF CORRECTION

PATENT NO. : 8,792,924 B2  
APPLICATION NO. : 13/102853  
DATED : July 29, 2014  
INVENTOR(S) : Weimin Xiao et al.

Page 1 of 1

It is certified that error appears in the above-identified patent and that said Letters Patent is hereby corrected as shown below:

In the Claims  
In Col. 28, line 12, claim 12, delete "11, the" and insert --11, wherein the--  
In Col. 28, line 16, claim 14, delete "11, the" and insert --11, wherein the--  
In Col. 29, line 38, claim 26, delete "from a the first" and insert --from the first--

Signed and Sealed this  
Seventh Day of October, 2014

Michelle K. Lee  
*Deputy Director of the United States Patent and Trademark Office*